(12) United States Patent
Xu et al.

(10) Patent No.: US 12,348,723 B2
(45) Date of Patent: Jul. 1, 2025

(54) COMBINED INTRA AND INTRA-BLOCK COPY PREDICTION FOR VIDEO CODING

(71) Applicants: Beijing Bytedance Network Technology Co., Ltd., Beijing (CN); Bytedance Inc., Los Angeles, CA (US)

(72) Inventors: Jizheng Xu, San Diego, CA (US); Weijia Zhu, San Diego, CA (US); Li Zhang, San Diego, CA (US); Kai Zhang, San Diego, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 297 days.

(21) Appl. No.: 17/532,491

(22) Filed: Nov. 22, 2021

(65) Prior Publication Data
US 2022/0086447 A1    Mar. 17, 2022

Related U.S. Application Data

(63) Continuation of application No. PCT/CN2020/094101, filed on Jun. 3, 2020.

(30) Foreign Application Priority Data

Jun. 3, 2019    (WO) ................ PCT/CN2019/089789
Jul. 23, 2019   (WO) ................ PCT/CN2019/097311

(51) Int. Cl.
*H04N 19/00*    (2014.01)
*H04N 19/105*   (2014.01)
(Continued)

(52) U.S. Cl.
CPC .......... *H04N 19/132* (2014.11); *H04N 19/105* (2014.11); *H04N 19/159* (2014.11); *H04N 19/176* (2014.11); *H04N 19/186* (2014.11)

(58) Field of Classification Search
CPC .. H04N 19/132; H04N 19/105; H04N 19/159; H04N 19/176; H04N 19/186
See application file for complete search history.

(56) References Cited

U.S. PATENT DOCUMENTS 8,804,816 B2    8/2014  Li et al.
8,958,649 B2    2/2015  Zhang et al.
(Continued)

FOREIGN PATENT DOCUMENTS

CN    105264888 A    1/2016
CN    105874797 A    8/2016
(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.
(Continued)

*Primary Examiner* — Zhihan Zhou
(74) *Attorney, Agent, or Firm* — Conley Rose, P.C.

(57) ABSTRACT

Combined intra and intra-block copy prediction for video coding is disclosed. A video processing method includes generating, for a conversion between a block of a video and a bitstream representation of the block, prediction for the block with a combined method which uses intra block copy (IBC) prediction and intra prediction in combination; and performing the conversion based on the prediction.

16 Claims, 37 Drawing Sheets

SPLIT_BT_VER

SPLIT_BT_HOR

SPLIT_TT_VER

SPLIT_TT_HOR

(51) Int. Cl.
*H04N 19/132* (2014.01)
*H04N 19/159* (2014.01)
*H04N 19/176* (2014.01)
*H04N 19/186* (2014.01)

(56) References Cited

U.S. PATENT DOCUMENTS

| | | | |
|---|---|---|---|
| 9,031,129 | B2 | 5/2015 | Xu et al. |
| 9,554,150 | B2 | 1/2017 | Zhang et al. |
| 9,648,321 | B2 | 5/2017 | Wang et al. |
| 10,218,544 | B1 | 2/2019 | Zhang et al. |
| 10,469,847 | B2 | 11/2019 | Xiu et al. |
| 2017/0094274 | A1* | 3/2017 | Chien ............ H04N 19/159 |
| 2017/0142418 | A1* | 5/2017 | Li ................. H04N 19/159 |
| 2017/0318302 | A1* | 11/2017 | Ye ................. H04N 19/70 |
| 2017/0339405 | A1* | 11/2017 | Wang ............ H04N 19/593 |
| 2019/0037213 | A1* | 1/2019 | Hermansson .... H04N 19/157 |
| 2019/0045184 | A1 | 2/2019 | Zhang et al. |
| 2020/0036986 | A1 | 1/2020 | Tsai et al. |
| 2020/0120353 | A1* | 4/2020 | Xu ................. H04N 19/96 |
| 2020/0314432 | A1 | 10/2020 | Wang et al. |
| 2020/0396462 | A1 | 12/2020 | Zhang et al. |
| 2020/0396467 | A1* | 12/2020 | Lai ................ H04N 19/103 |
| 2021/0144366 | A1 | 5/2021 | Zhang et al. |
| 2021/0144388 | A1 | 5/2021 | Zhang et al. |
| 2021/0227207 | A1 | 7/2021 | Zhang et al. |
| 2021/0274167 | A1 | 9/2021 | Liu et al. |
| 2022/0014761 | A1 | 1/2022 | Zhang et al. |
| 2022/0070441 | A1* | 3/2022 | Xiu ............... H04N 19/70 |
| 2022/0191530 | A1* | 6/2022 | Sim ............... H04N 19/593 |

FOREIGN PATENT DOCUMENTS

| | | |
|---|---|---|
| CN | 106375764 A | 2/2017 |
| CN | 108781283 A | 11/2018 |
| CN | 109743576 A | 5/2019 |
| WO | 2016070845 A1 | 5/2016 |
| WO | 2017123133 A1 | 7/2017 |

OTHER PUBLICATIONS

Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1002, 2019.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0100, 2018.

"Information Technology—High Efficiency Coding and Media Delivery in Heterogeneous Environments—Part 2: High Efficiency Video Coding" Apr. 20, 2018, ISO/DIS 23008, 4th Edition.

Ikeda et al. "CE11.1.6, CE11.1.7 and CE11.1.8: Joint Proposals for Long Deblocking from Sony, Qualcomm, Sharp, Ericsson," Joint Video Experts Team (JVET) of ITU-T SG 16 WP 3 and ISO/IEC JTC 1/SC 29/WG 11 13th Meeting: Marrakesh, MA, Jan. 9-18, 2019, document JVET-M0471, 2019.

Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0054, 2018.

Pfaff et al. "CE3: Affine Linear Weighted Intra Prediction (Yest 1.2.1, Test 1.2.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0043, 2019.

Pfaff et al. "CE3: Affine Linear Weighted Intra Prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0217, 2019.

Sethuraman et al. "CE9: Results of DMVR Related Tests CE9.2.1 and CE9.2.2," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0147, 2019.

Sun et al. "CE8: Palette Mode and Intra Mode Combination (Test8.2.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0051, 2019.

Xu et al. "CE8-Related: Combination Test of JVET-N0176/JVET-N0317/JVET-N0382 on Simplification of IBC Vector Prediction." Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0843, 2019.

https://vcgit.hhi.fraunhofer.de/jvet/VVCSoftware_VTM/tags/VTM-5.0.

International Search Report and Written Opinion from PCT/CN2020/094101 dated Aug. 26, 2020 (11 pages).

First Office Action for Chinese Application No. 202080041014.1, mailed on Mar. 31, 2025, 44 pages.

* cited by examiner

FIG. 34

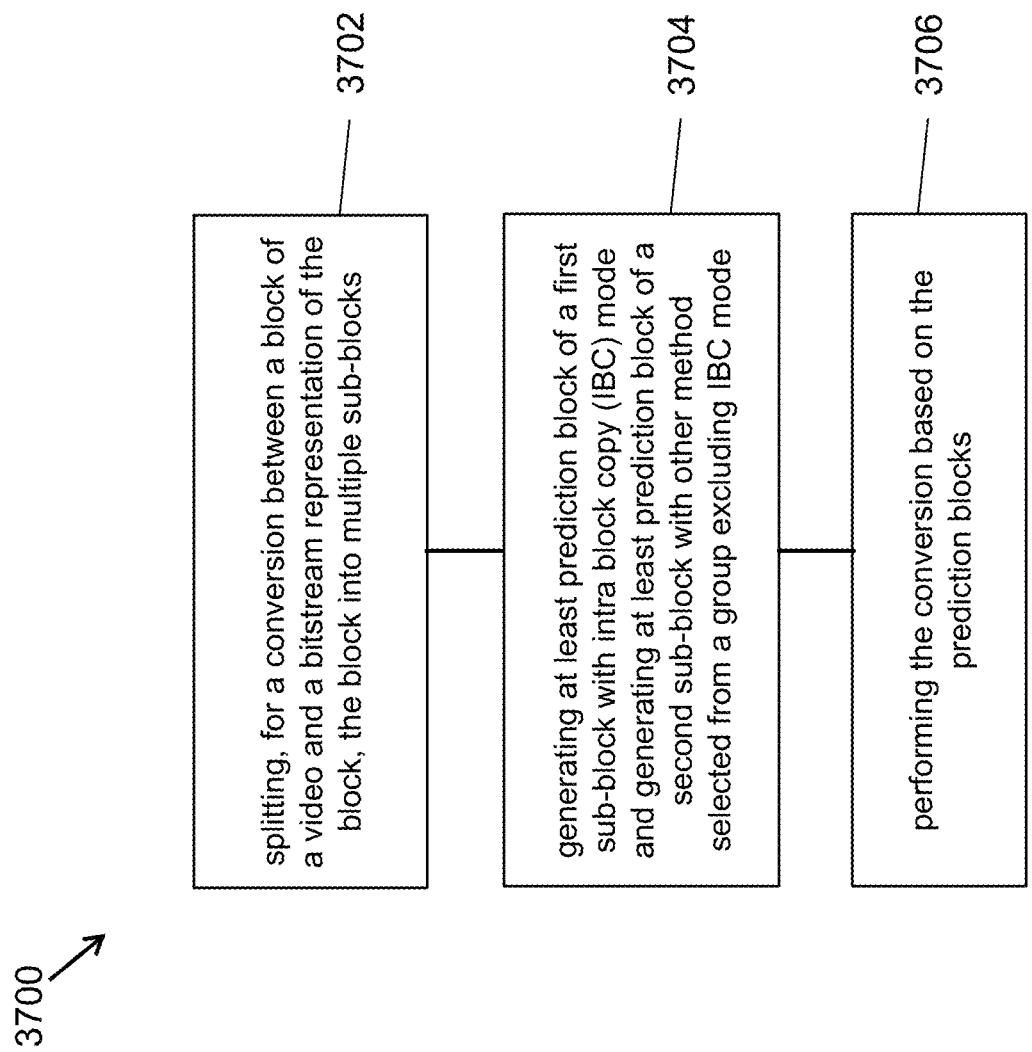

COMBINED INTRA AND INTRA-BLOCK COPY PREDICTION FOR VIDEO CODING

CROSS-REFERENCE TO RELATED APPLICATION

This application is a continuation of International Application No. PCT/CN2020/094101, filed on Jun. 3, 2020, which claims the priority to and benefits of International Patent Application No. PCT/CN2019/089789, filed on Jun. 3, 2019 and No. PCT/CN2019/097311, filed on July 23. All the aforementioned applications are incorporated by reference as part of the disclosure of this application.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments in which intra and inter block-based coding or decoding is performed using certain coding rules.

In one example aspect, a method of video processing is disclosed. The method includes determining, during a conversion between a video block comprising one or more component blocks and a bitstream representation of the video block, to use a first intra coding technique for the conversion of a first portion of the video block and a second intra coding technique different from the first intra coding technique for a second portion of the video block that is different from the first portion based on a condition satisfied by the video block; and performing the conversion using the first intra coding technique and the second intra coding technique according to the determining.

In one example aspect, a method of video processing is disclosed. The method includes generating, for a conversion between a block of a video and a bitstream representation of the block, prediction for the block with a combined method which uses intra block copy (IBC) prediction and intra prediction in combination; and performing the conversion based on the prediction.

In one example aspect, a method of video processing is disclosed. The method includes splitting, for a conversion between a block of a video and a bitstream representation of the block, the block into multiple sub-blocks; generating at least prediction block of a first sub-block with intra block copy (IBC) mode and generating at least prediction block of a second sub-block with other method selected from a group excluding IBC mode; and performing the conversion based on the prediction blocks.

In another example aspect, the above-described methods may be implemented by a video decoder apparatus that comprises a processor.

In another example aspect, the above-described methods may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 34 shows an example of horizontal and vertical traverse scans.

FIG. 37 shows an example of an example method of video processing.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to prediction block generation. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Partitioning of the CTUs Using a Tree Structure

Figure 1:
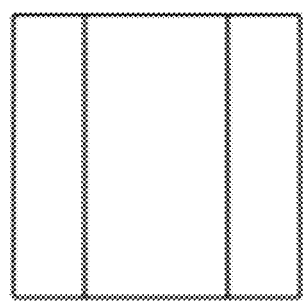
FIG. 1 shows an example of multi-type tree splitting modes.
Figure 1:
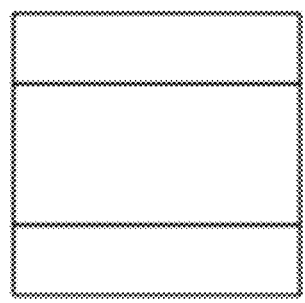
Figure 1:
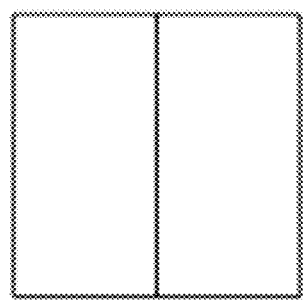
Figure 1:
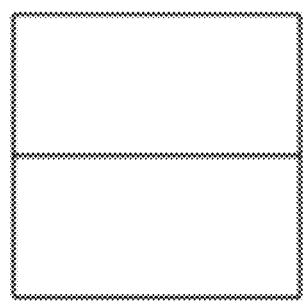

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU. In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 1, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 2:
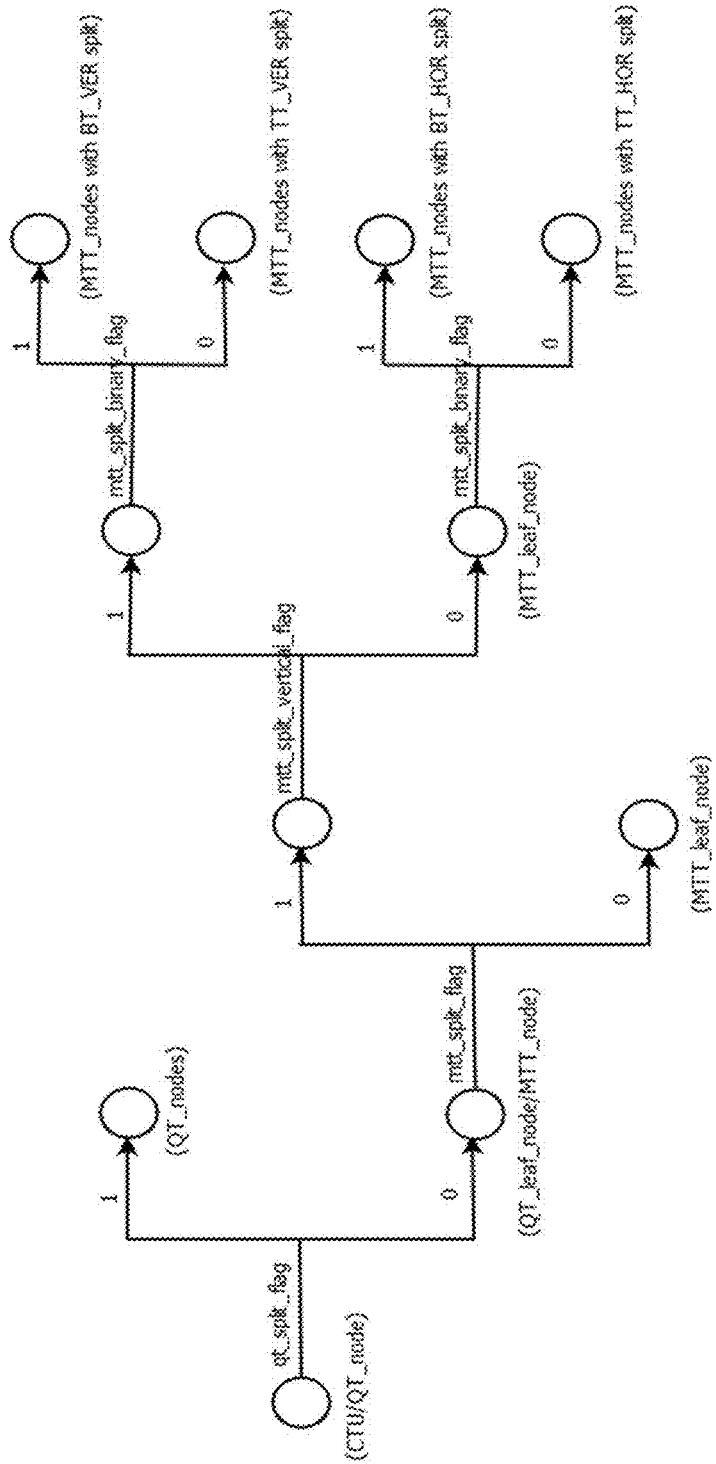
FIG. 2 shows an example of splitting flags signaling in quadtree with nested multi-type tree coding tree structure.

FIG. 2 illustrates the signaling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signaled to indicate whether the node is further partitioned; when a node is further partitioned, a second flag (mtt_split_cu_vertical_flag) is signaled to indicate the splitting direction, and then a third flag (mtt_split_cu_binary_flag) is signaled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

TABLE 1

MttSplitMode derviation based on multi-type tree syntax elements

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 3:
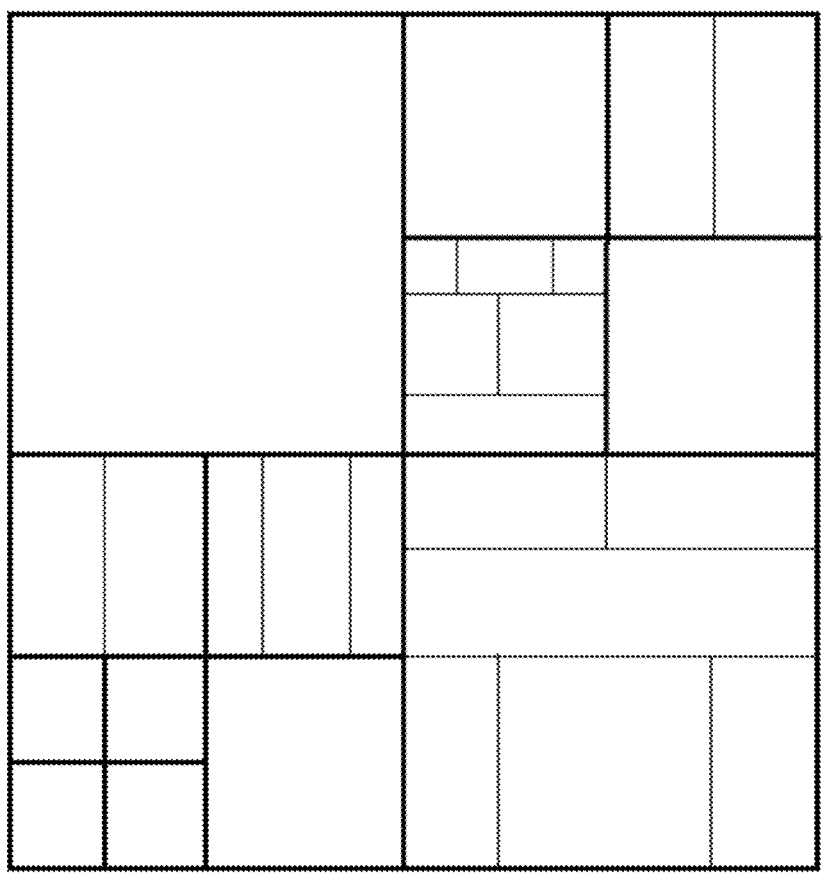
FIG. 3 shows an example of quadtree with nested multi-type tree coding block structure.

FIG. 3 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum chroma CB size is 2×2.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined and specified by SPS syntax elements for the quadtree with nested multi-type tree coding tree scheme.

CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node could be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinBtSize and smaller or equal to 2*MinTtSize, no further horizontal splitting is considered. Similarly, when the multi-type tree node has height equal to MinBtSize and smaller or equal to 2*MinTtSize, no further vertical splitting is considered.

Figure 4:
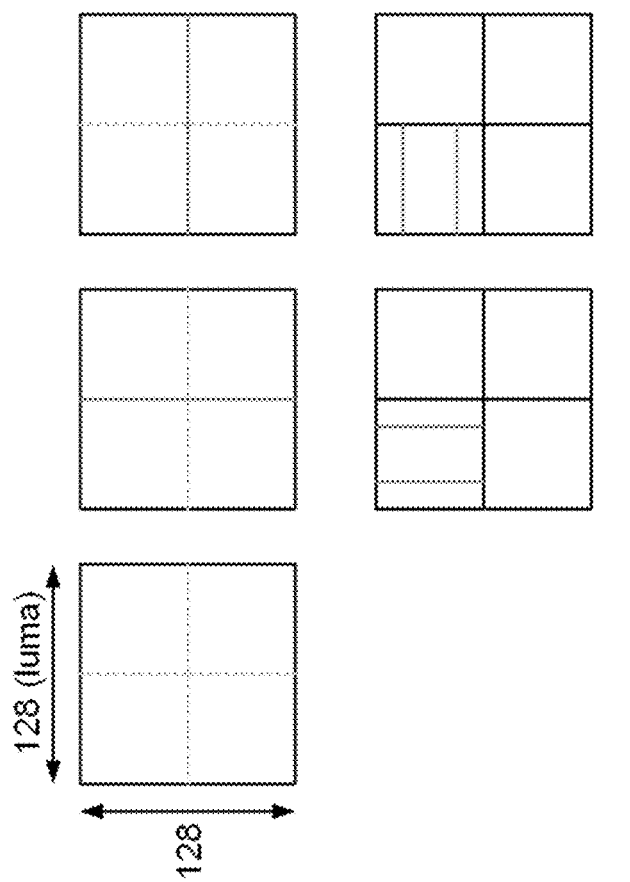
FIG. 4 shows an example of No TT split for 128×128 coding block.

To allow 64×64 Luma block and 32×32 Chroma pipelining design in VVC hardware decoders, TT split is forbidden when either width or height of a luma coding block is larger than 64, as shown in FIG. 4. TT split is also forbidden when either width or height of a chroma coding block is larger than 32.

In VTM5, the coding tree scheme supports the ability for the luma and chroma to have a separate block tree structure. Currently, for P and B slices, the luma and chroma CTBs in one CTU have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

2.2. Intra Prediction in VVC 2.2.1. 67 Intra Prediction Modes

Figure 5:
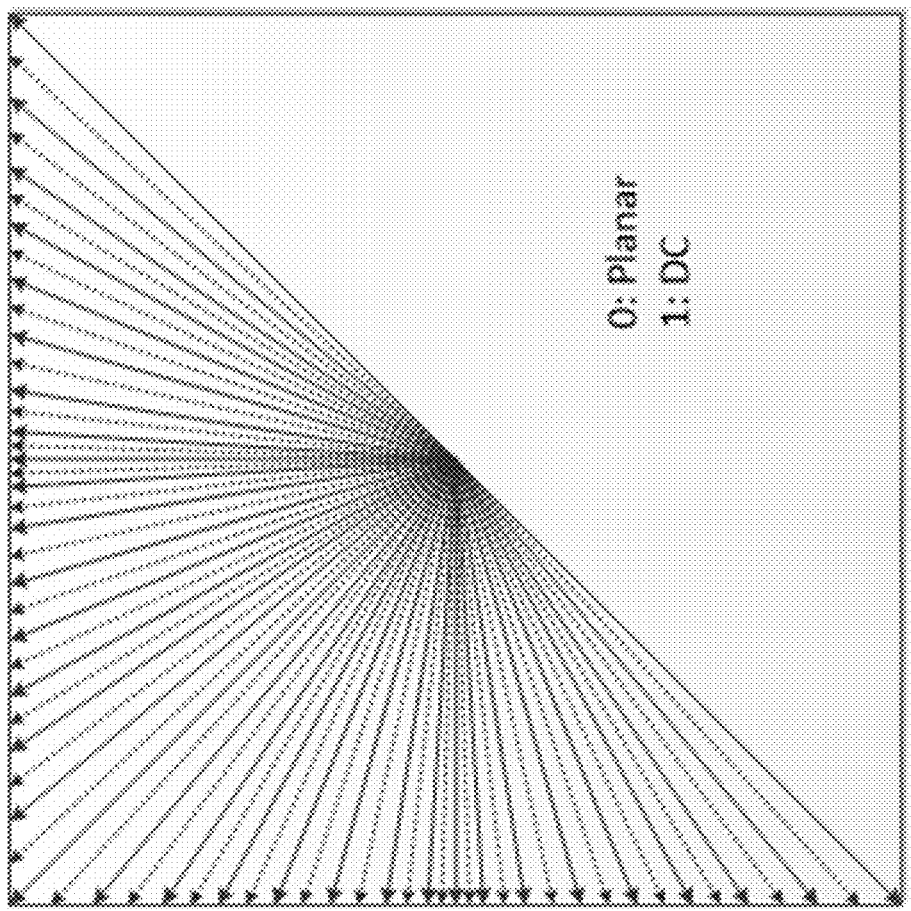
FIG. 5 shows 67 intra prediction mode example.

To capture the arbitrary edge directions presented in natural video, the number of directional intra modes in VTM4 is extended from 33, as used in HEVC, to 65. The new directional modes not in HEVC are depicted as red dotted arrows in FIG. 5, and the planar and DC modes remain the same. These denser directional intra prediction modes apply for all block sizes and for both luma and chroma intra predictions.

2.2.2. Position Dependent Intra Prediction Combination (PDPC)

In the VTM4, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes. The prediction sample pred(x,y) is predicted using an intra prediction mode (DC, planar, angular) and a linear combination of reference samples according to the equation as follows:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6$$

where $R_{x,-1}$, $R_{-1,y}$ represent the reference samples located at the top and left of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

2.2.3. Cross-Component Linear Model Prediction (CCLM)

Figure 6:
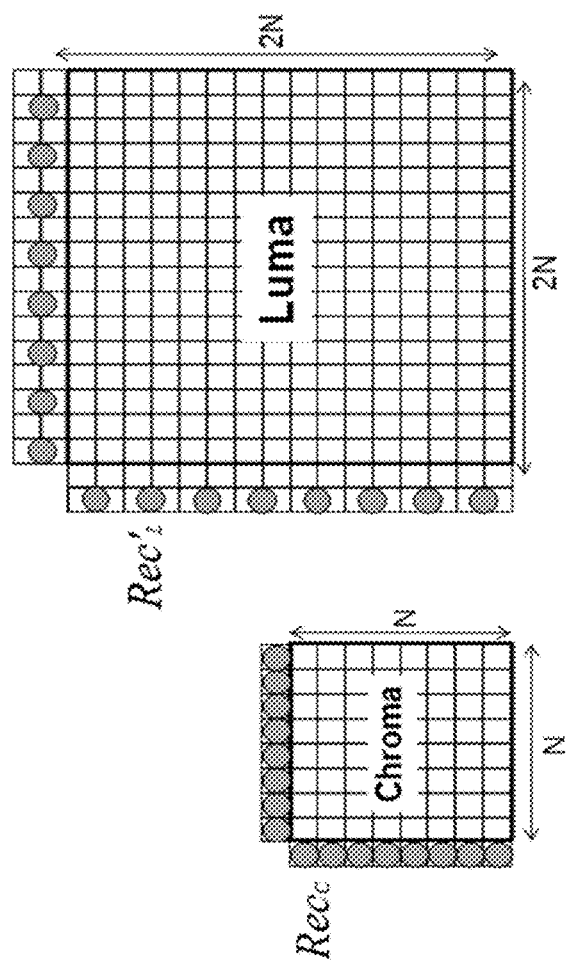
FIG. 6 shows example locations of the samples used for the derivation of $\alpha$ and $\beta$.

To reduce the cross-component redundancy, a cross-component linear model (CCLM) prediction mode is used in the VTM4, for which the chroma samples are predicted based on the reconstructed luma samples of the same CU by using a linear model as follows:

$$\text{pred}_C(i,j) = \alpha \cdot \text{rec}_L'(i,j) + \beta$$

where $\text{pred}_C(i, j)$ represents the predicted chroma samples in a CU and $\text{rec}_L(i, j)$ represents the downsampled reconstructed luma samples of the same CU. Linear model parameter α and β are derived from the relation between luma values and chroma values from two samples, which are luma sample with minimum sample value and with maximum sample inside the set of downsampled neighboring luma samples, and their corresponding chroma samples. FIG. 6 shows an example of the location of the left and above samples and the sample of the current block involved in the CCLM mode.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

2.2.4. Multiple Reference Line (MRL) Intra Prediction

Figure 7:
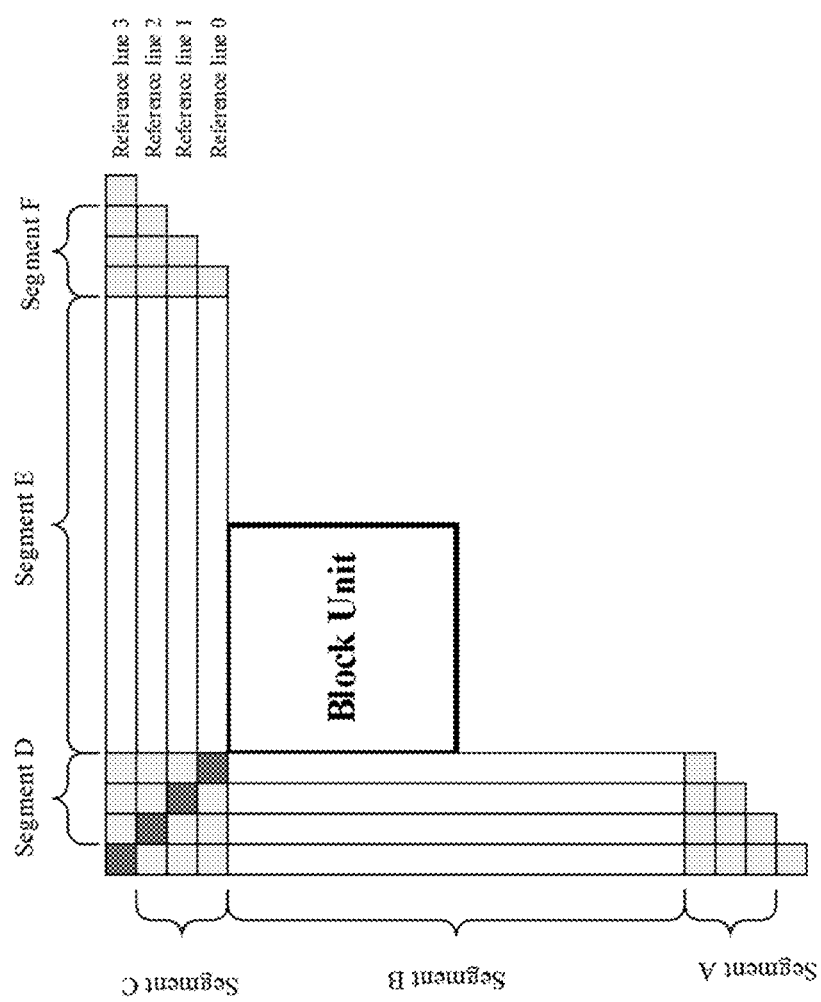
FIG. 7 shows example of four reference lines neighboring to a prediction block.

Multiple reference line (MRL) intra prediction uses more reference lines for intra prediction. In FIG. 7 shows an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used. The index of selected reference line (mrl_idx) is signaled and used to generate intra predictor. For reference line idx, which is greater than 0, only include additional reference line modes in MPM list and only signal mpm index without remaining mode.

2.2.5. Intra Sub-Partitions (ISP)

Figure 8:
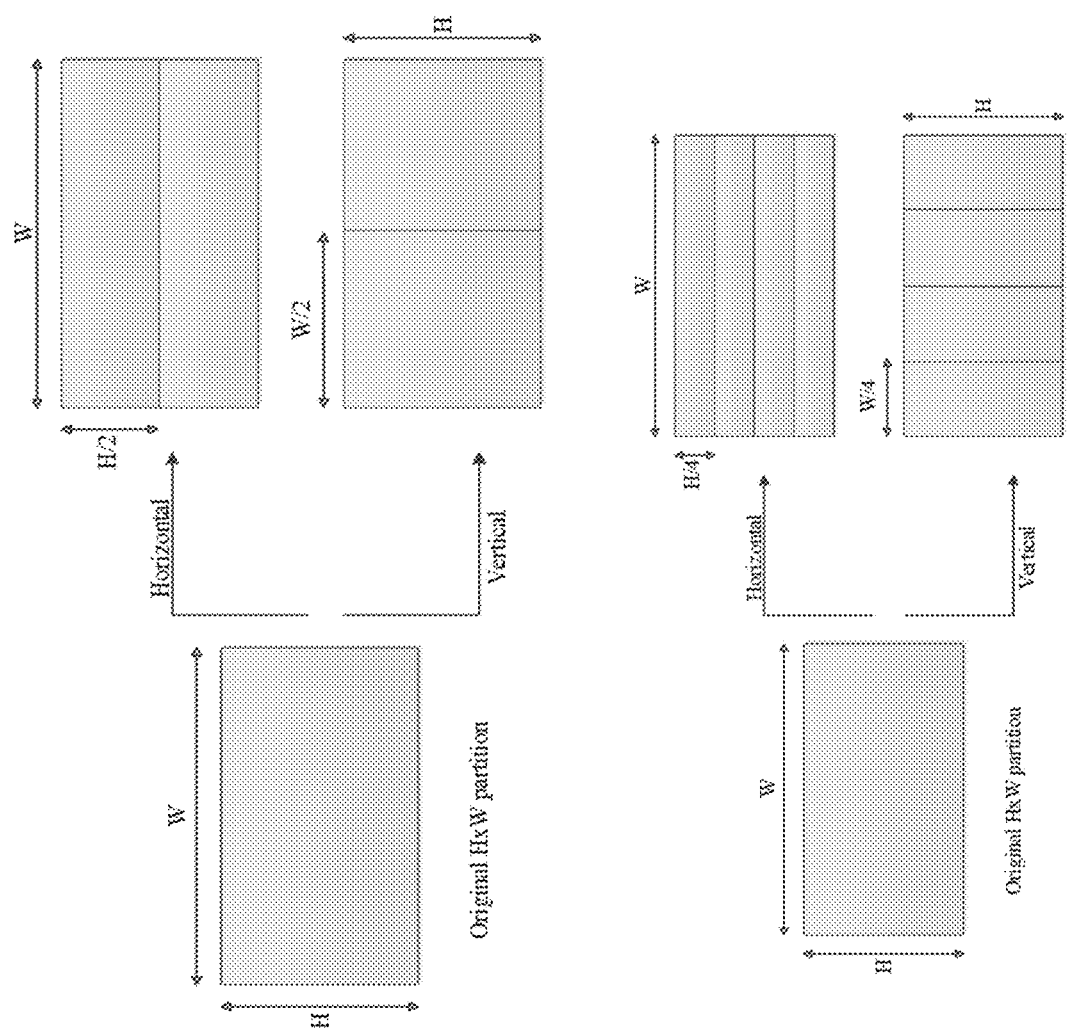
FIG. 8 shows Sub-partition depending on the block size— Examples of sub-partitions for 4×8 (top) and 8×4 CUs and Examples of sub-partitions for CUs other than 4×8, 8×4 and 4×4 (bottom).
Figure 9:
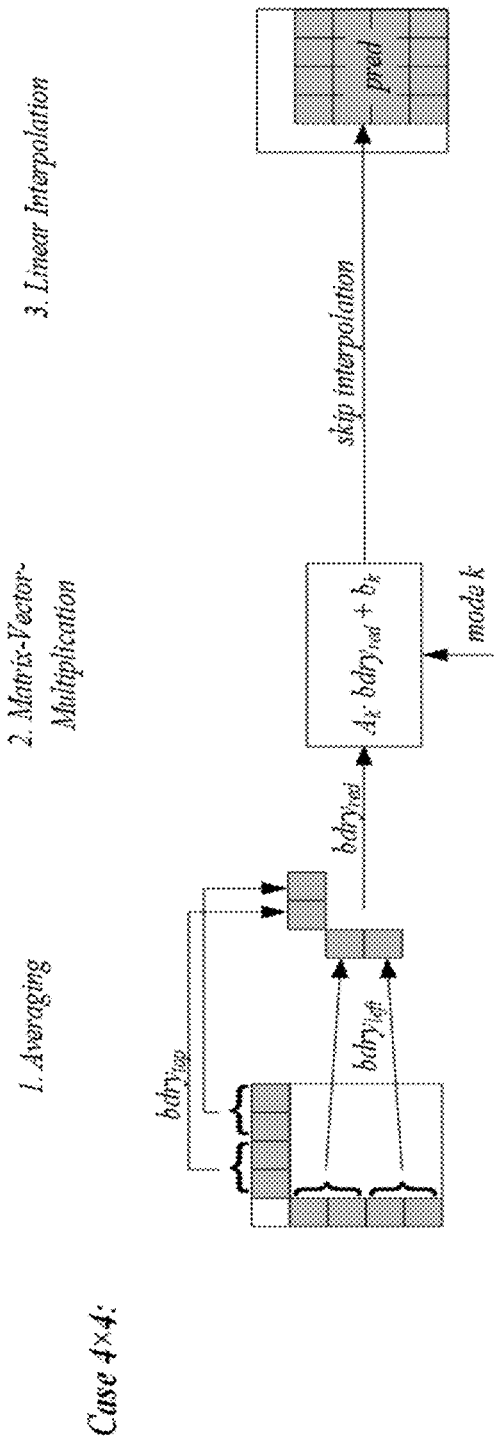
FIG. 9 is an illustration of ALWIP for 4×4 blocks.
Figure 10:
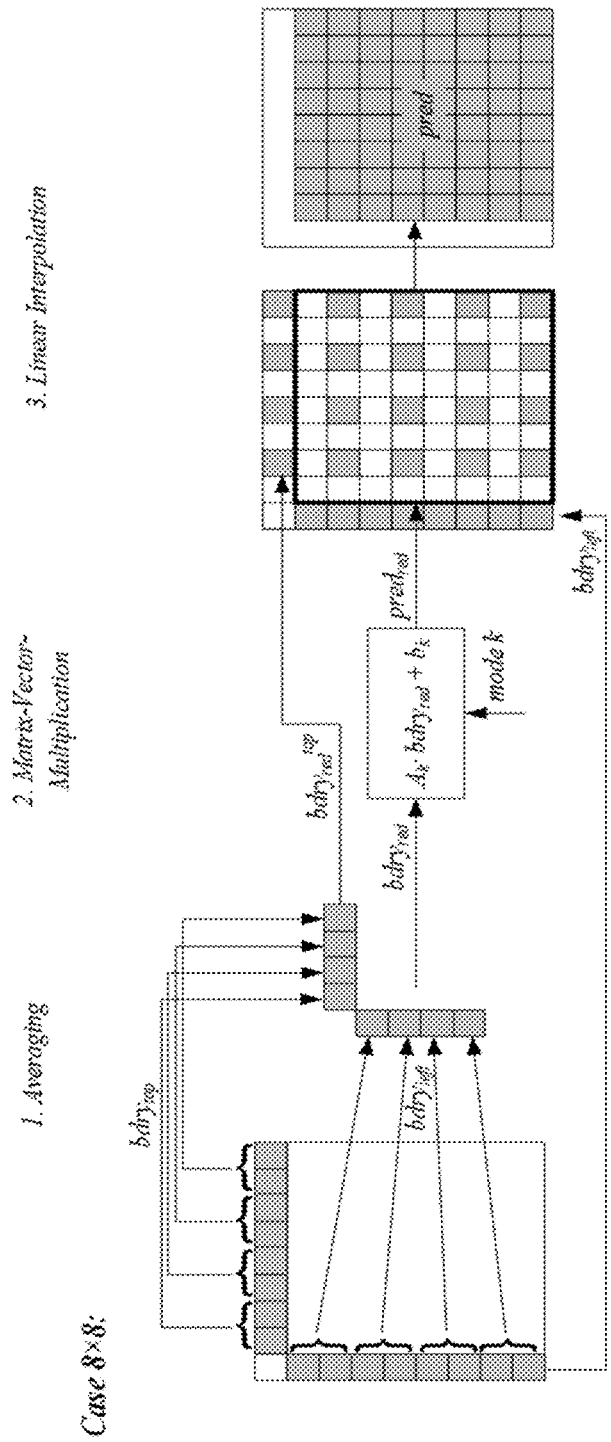
FIG. 10 is an illustration of ALWIP for 8×8 blocks.
Figure 11:
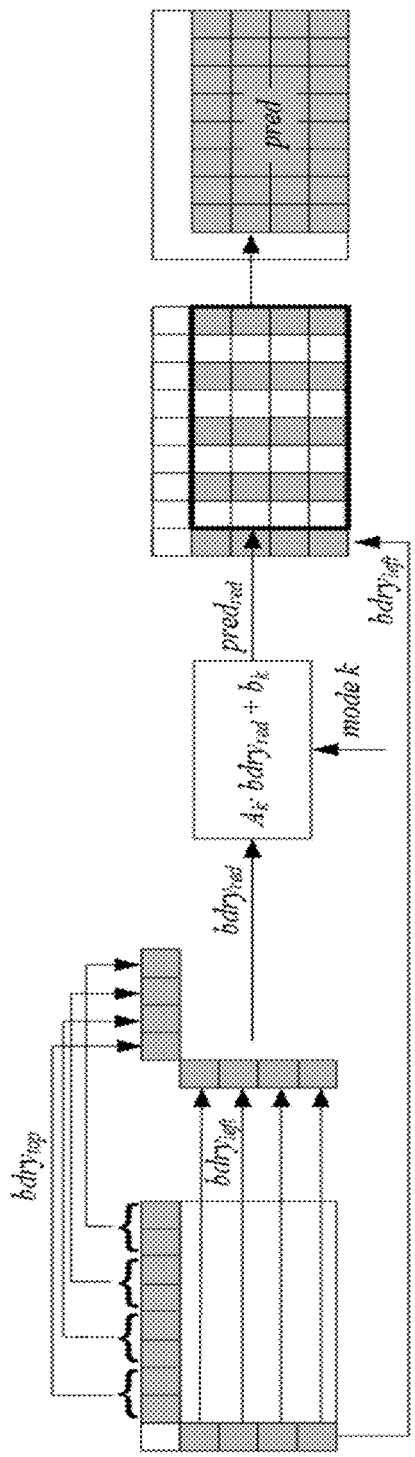
FIG. 11 is an illustration of ALWIP for 8×4 blocks.
Figure 12:
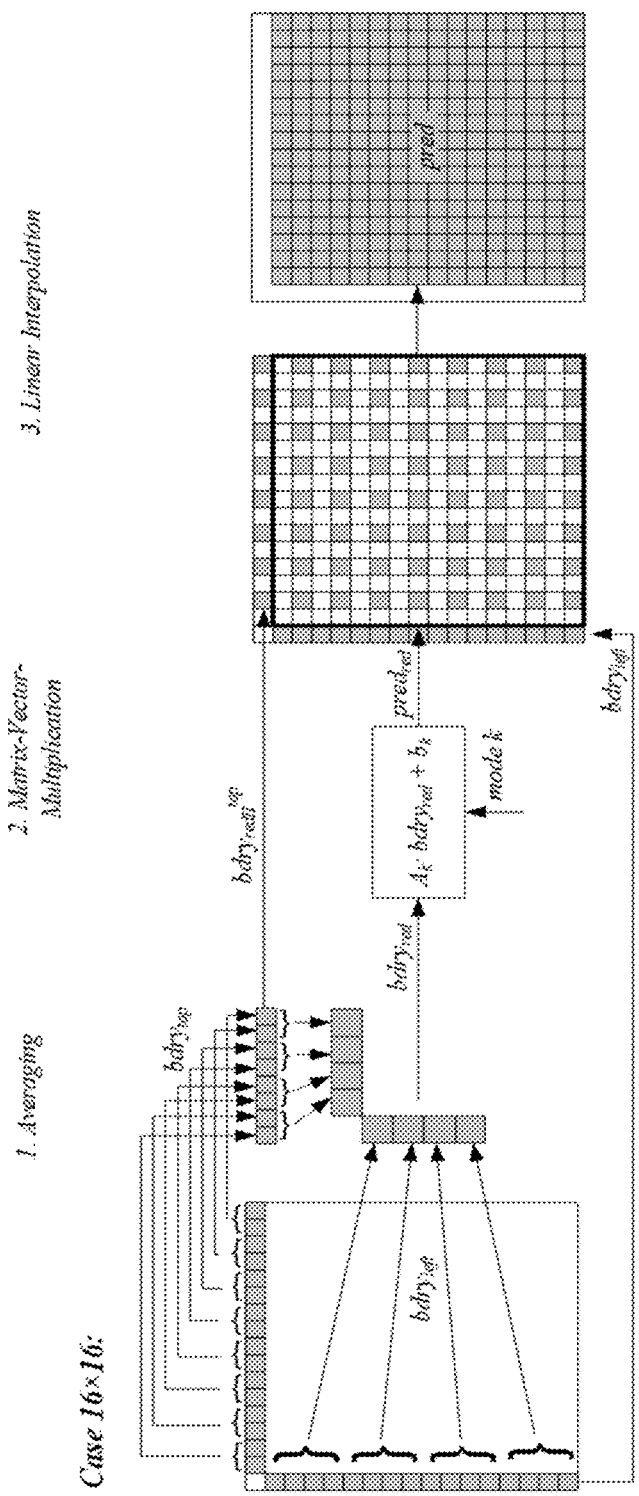
FIG. 12 is an illustration of ALWIP for 16×16 blocks.

The Intra Sub-Partitions (ISP) tool divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. FIG. 8 shows examples of the two possibilities. All sub-partitions fulfill the condition of having at least 16 samples.

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode.

2.2.6. Affine Linear Weighted Intra Prediction (ALWIP, a.k.a. Matrix Based Intra Prediction)

Affine linear weighted intra prediction (ALWIP, a.k.a. Matrix based intra prediction (MIP)) is proposed.

Two tests are conducted. In test 1, ALWIP is designed with a memory restriction of 8K bytes and at most 4 multiplications per sample. Test 2 is similar to test 1, but further simplifies the design in terms of memory requirement and model architecture.

- Single set of matrices and offset vectors for all block shapes.
- Reduction of number of modes to 19 for all block shapes.
- Reduction of memory requirement to 5760 10-bit values, that is 7.20 Kilobyte.
- Linear interpolation of predicted samples is carried out in a single step per direction replacing iterative interpolation as in the first test.

2.2.6.1. Test 1

For predicting the samples of a rectangular block of width W and height H, affine linear weighted intra prediction (ALWIP) takes one line of H reconstructed neighbouring boundary samples left of the block and one line of W reconstructed neighbouring boundary samples above the block as input. If the reconstructed samples are unavailable, they are generated as it is done in the conventional intra prediction.

The generation of the prediction signal is based on the following three steps:

1. Out of the boundary samples, four samples in the case of W=H=4 and eight samples in all other cases are extracted by averaging.
2. A matrix vector multiplication, followed by addition of an offset, is carried out with the averaged samples as an input. The result is a reduced prediction signal on a subsampled set of samples in the original block.
3. The prediction signal at the remaining positions is generated from the prediction signal on the subsampled set by linear interpolation which is a single step linear interpolation in each direction.

The matrices and offset vectors needed to generate the prediction signal are taken from three sets $S_0$, $S_1$, $S_2$ of matrices. The set $S_0$ consists of 18 matrices $A_0^i$, $i \in \{0, \ldots, 17\}$ each of which has 16 rows and 4 columns and 18 offset vectors $b_0^i$, $i \in \{0, \ldots, 17\}$ each of size 16. Matrices and offset vectors of that set are used for blocks of size 4×4. The set $S_1$ consists of 10 matrices $A_1^i$, $i \in \{0, \ldots, 9\}$, each of which has 16 rows and 8 columns and 10 offset vectors $b_1^i$, $i \in \{0, \ldots, 9\}$ each of size 16. Matrices and offset vectors of that set are used for blocks of sizes 4×8, 8×4 and 8×8. Finally, the set $S_2$ consists of 6 matrices $A_2^i$, $i \in \{0, \ldots, 5\}$, each of which has 64 rows and 8 columns and of 6 offset vectors $b_2^i$, $i \in \{0, \ldots, 5\}$ of size 64. Matrices and offset vectors of that set or parts of these matrices and offset vectors are used for all other block-shapes.

The total number of multiplications needed in the computation of the matrix vector product is always smaller than or equal to 4×W×H. In other words, at most four multiplications per sample are required for the ALWIP modes.

2.2.6.2. Averaging of the Boundary

In a first step, the input boundaries $bdry^{top}$ and $bdry^{left}$ are reduced to smaller boundaries $bdry_{red}^{top}$ and $bdry_{red}^{left}$. Here, $bdry_{red}^{top}$ and $bdry_{red}^{left}$ both consists of 2 samples in the case of a 4×4-block and both consist of 4 samples in all other cases.

In the case of a 4×4-block, for $0 \le i < 2$, one defines $$bdry_{red}^{top}[i] = \left(\left(\sum_{j=0}^{1} bdry^{top}[i \cdot 2 + j]\right) + 1\right) \gg 1$$

and defines $bdry_{red}^{left}$ analogously.

Otherwise, if the block-width W is given as $W = 4 \cdot 2^k$, for $0 \le i < 4$, one defines $$bdry_{red}^{top}[i] = \left(\left(\sum_{j=0}^{2^k - 1} bdry^{top}[i \cdot 2^k + j]\right) + (1 \ll (k - 1))\right) \gg k$$

and defines $bdry_{red}^{left}$ analogously.

The two reduced boundaries $bdry_{red}^{top}$ and $bdry_{red}^{left}$ are concatenated to a reduced boundary vector $bdry_{red}$ which is thus of size four for blocks of shape 4×4 and of size eight for blocks of all other shapes. If mode refers to the ALWIP-mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for max}(W, H) = 8 \text{ and mode} < 10 \\ [bdry_{red}^{left}, bdry_{red}^{top}] & \text{for max}(W, H) = 8 \text{ and mode} \geq 10 \\ [bdry_{red}^{top}, bdry_{red}^{left}] & \text{for max}(W, H) > 8 \text{ and mode} < 6 \\ [bdry_{red}^{left}, bdry_{red}^{top}] & \text{for max}(W, H) > 8 \text{ and mode} \geq 6 \end{cases}.$$

Finally, for the interpolation of the subsampled prediction signal, on large blocks a second version of the averaged boundary is needed. Namely, if min(W, H)>8 and W≥H, one writes $W=8*2^l$, and, for $0 \leq i < 8$, defines $$bdry_{redII}^{top}[i] = \left(\left(\sum_{j=0}^{2^l-1} bdry^{top}[i \cdot 2^l + j]\right) + (1 \ll (l-1))\right) \gg l.$$

If min(W, H)>8 and H>W, one defines $bdry_{redII}^{left}$ analogously.

2.2.6.3. Generation of the Reduced Prediction Signal by Matrix Vector Multiplication Out of the reduced input vector $bdry_{red}$ one generates a reduced prediction signal $pred_{red}$. The latter signal is a signal on the downsampled block of width $W_{red}$ and height $H_{red}$. Here, $W_{red}$ and $H_{red}$ are defined as:

$$W_{red} = \begin{cases} 4 & \text{for max}(W, H) \leq 8 \\ \min(W, 8) & \text{for max}(W, H) > 8 \end{cases}$$

$$H_{red} = \begin{cases} 4 & \text{for max}(W, H) \leq 8 \\ \min(H, 8) & \text{for max}(W, H) > 8 \end{cases}$$

The reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$.

The matrix A and the vector b are taken from one of the sets $S_0$, $S_1$, $S_2$ as follows. One defines an index idx=idx(W, H) as follows:

$$idx(W, H) = \begin{cases} 0 & \text{for } W = H = 4 \\ 1 & \text{for max}(W, H) = 8 \\ 2 & \text{for max}(W, H) > 8 \end{cases}.$$

Moreover, one puts m as follows:

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for max}(W, H) = 8 \text{ and mode} < 10 \\ \text{mode} - 9 & \text{for max}(W, H) = 8 \text{ and mode} \geq 10 \\ \text{mode} & \text{for max}(W, H) > 8 \text{ and mode} < 6 \\ \text{mode} - 5 & \text{for max}(W, H) > 8 \text{ and mode} \geq 6 \end{cases}.$$

Then, if idx≤1 or idx=2 and min(W, H)>4, one puts $A = A_{idx}^m$ and $b = b_{idx}^m$. In the case that idx=2 and min(W, H)=4, one lets A be the matrix that arises by leaving out every row of $A_{idx}^m$ that, in the case W=4, corresponds to an odd x-coordinate in the downsampled block, or, in the case H=4, corresponds to an odd y-coordinate in the downsampled block.

Finally, the reduced prediction signal is replaced by its transpose in the following cases:

W=H=4 and mode≥18 max(W, H)=8 and mode≥10 max(W, H)>8 and mode≥6

The number of multiplications required for calculation of $pred_{red}$ is 4 in the case of W=H=4 since in this case A has 4 columns and 16 rows. In all other cases, A has 8 columns and $W_{red} \cdot H_{red}$ rows and one immediately verifies that in these cases $8 \cdot W_{red} \cdot H_{red} \leq 4 \cdot W \cdot H$ multiplications are required, i.e. also in these cases, at most 4 multiplications per sample are needed to compute $pred_{red}$.

2.2.6.4. Illustration of the Entire ALWIP Process

The entire process of averaging, matrix vector multiplication and linear interpolation is illustrated for different shapes in FIGS. 9 to 12. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.

2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary.

The transposed case is treated accordingly.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical positions.

Finally for W×4 blocks with W>8, let $A_k$ be the matrix that arises by leaving out every row that corresponds to an odd entry along the horizontal axis of the downsampled block. Thus, the output size is 32 and again, only horizontal interpolation remains to be performed.

The transposed cases are treated accordingly.

In the following discussion, the boundary samples used to be multiplied with the matrix may be referred as "reduced boundary samples". The boundary samples used to interpolate the final prediction block from the down-sampled block may be referred as "upsampling boundary samples".

2.2.6.5. Single Step Linear Interpolation

For a W×H block with max(W, H)≥8, the prediction signal arises from the reduced prediction signal $pred_{red}$ on $W_{red} \times H_{red}$ by linear interpolation. Depending on the block shape, linear interpolation is done in vertical, horizontal or both directions. If linear interpolation is to be applied in both directions, it is first applied in horizontal direction if W<H and it is first applied in vertical direction, else.

Consider without loss of generality a W×H block with max(W, H)≥8 and W≥H. Then, the one-dimensional linear interpolation is performed as follows. Without loss of generality, it suffices to describe linear interpolation in vertical direction. First, the reduced prediction signal is extended to the top by the boundary signal. Define the vertical upsampling factor $U_{ver}=H/H_{red}$ and write $U_{ver}=2^{u_{ver}}>1$. Then, define the extended reduced prediction signal by $$pred_{red}[x][-1] = \begin{cases} bdry_{red}^{top}[x] & \text{for } W = 8 \\ bdry_{redII}^{top}[x] & \text{for } W > 8 \end{cases}.$$

Then, from this extended reduced prediction signal, the vertically linear interpolated prediction signal is generated by $$pred_{red}^{ups,ver}[x][U_{ver} \cdot y + k] =$$
$$\left( (U_{ver} - k - 1) \cdot pred_{red}[x][y-1] + (k+1) \cdot pred_{red}[x][y] + \frac{U_{ver}}{2} \right) \gg u_{ver}$$
$$\text{for } 0 \le x < W_{red}, 0 \le y < H_{red} \text{ and } 0 \le k < U_{ver}.$$

2.2.6.6. Signalization of the Proposed Intra Prediction Modes

For each Coding Unit (CU) in intra mode, a flag indicating if an ALWIP mode is to be applied on the corresponding Prediction Unit (PU) or not is sent in the bitstream. The signalization of the latter index is harmonized with MRL. If an ALWIP mode is to be applied, the index predmode of the ALWIP mode is signaled using a MPM-list with 3 MPMS.

Here, the derivation of the MPMs is performed using the intra-modes of the above and the left PU as follows. There are three fixed tables map_angular_to_alwip$_{idx}$, idx∈{0,1,2} that assign to each conventional intra prediction mode predmode$_{Angular}$ an ALWIP mode predmode$_{ALWIP}$=map_angular_to_alwip$_{idx}$[predmode$_{Angular}$].

For each PU of width W and height H one defines an index idx(PU)=idx(W,H)∈{0,1,2} that indicates from which of the three sets the ALWIP-parameters are to be taken as in Section 2.2.6.3 above.

If the above Prediction Unit PU$_{above}$ is available, belongs to the same CTU as the current PU and is in intra mode, if idx(PU)=idx(PU above) above) and if ALWIP is applied on PU$_{above}$ with ALWIP-mode predmode$_{ALWIP}^{above}$, one puts mode$_{ALWIP}^{above}$=predmode$_{ALWIP}^{above}$.

If the above PU is available, belongs to the same CTU as the current PU and is in intra above mode and if a conventional intra prediction mode predmode$_{Angular}^{above}$ is applied on the above PU, one puts mode$_{ALWIP}^{above}$=map_angular_to_alwip$_{idx(PU_{above})}$[predmode$_{Angular}^{above}$].

In all other cases, one puts mode$_{ALWIP}^{above}$=−1 which means that this mode is unavailable. In the same way but without the restriction that the left PU needs to belong to the same CTU as the current PU, one derives a mode mode$_{ALWIP}^{left}$.

Finally, three fixed default lists list$_{idx}$, idx∈{0,1,2} are provided, each of which contains three distinct ALWIP modes. Out of the default list list$_{idx(PU)}$ and the modes mode$_{ALWIP}^{above}$ and mode$_{ALWIP}^{left}$, one constructs three distinct MPMs by substituting−1 by default values as well as eliminating repetitions.

The left neighbouring block and above neighbouring block used in the ALWIP MPM list construction is A1 and B1.

2.2.6.7. Adapted MPM-List Derivation for Conventional Luma and Chroma Intra-Prediction Modes The proposed ALWIP-modes are harmonized with the MPM-based coding of the conventional intra-prediction modes as follows. The luma and chroma MPM-list derivation processes for the conventional intra-prediction modes uses fixed tables map_alwip_to_angular$_{idx}$, idx∈{0,1,2}, mapping an ALWIP-mode predmode$_{ALWIP}$ on a given PU to one of the conventional intra-prediction modes predmode$_{Angular}$=map_alwip_to_angular$_{idx(PU)}$[predmode$_{ALWIP}$].

For the luma MPM-list derivation, whenever a neighboring luma block is encountered which uses an ALWIP-mode predmode$_{ALWIP}$, this block is treated as if it was using the conventional intra-prediction mode predmode$_{Angular}$. For the chroma MPM-list derivation, whenever the current luma block uses an LWIP-mode, the same mapping is used to translate the ALWIP-mode to a conventional intra prediction mode.

2.3. Inter Prediction in HEVC/H.265

For inter-coded coding units (CUs), it may be coded with one prediction unit (PU), 2 PUs according to partition mode. Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.3.1. Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.3.2. Merge Mode

2.3.2.1. Derivation of Candidates for Merge Mode

Figure 13:
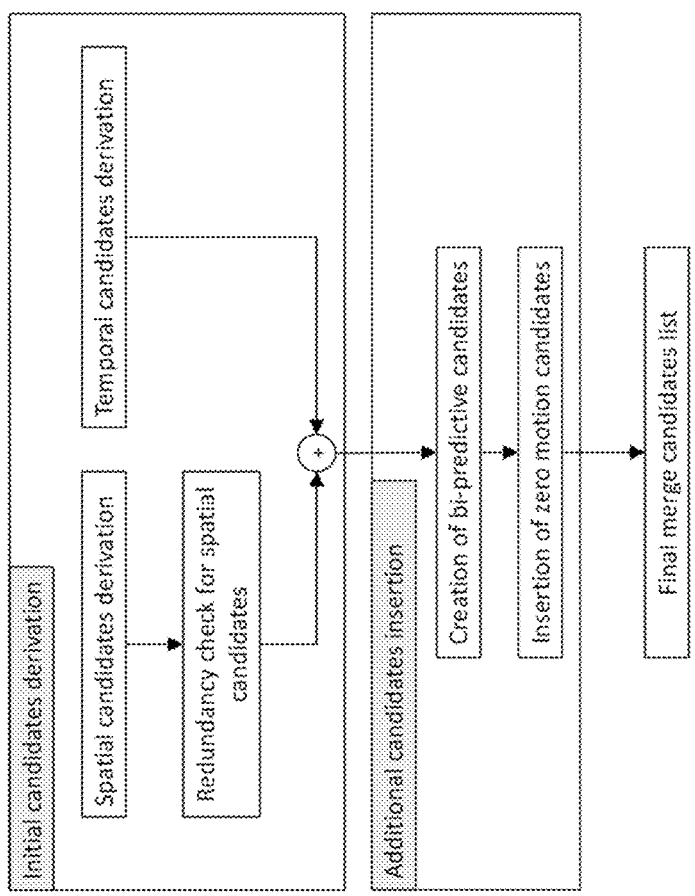
FIG. 13 shows an example of derivation process for merge candidates list construction.

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
   Step 1.1: Spatial candidates derivation
   Step 1.2: Redundancy check for spatial candidates
   Step 1.3: Temporal candidates derivation
Step 2: Additional candidates insertion
   Step 2.1: Creation of bi-predictive candidates
   Step 2.2: Insertion of zero motion candidates These steps are also schematically depicted in FIG. 13. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.3.2.2. Spatial Candidates Derivation

Figure 14:
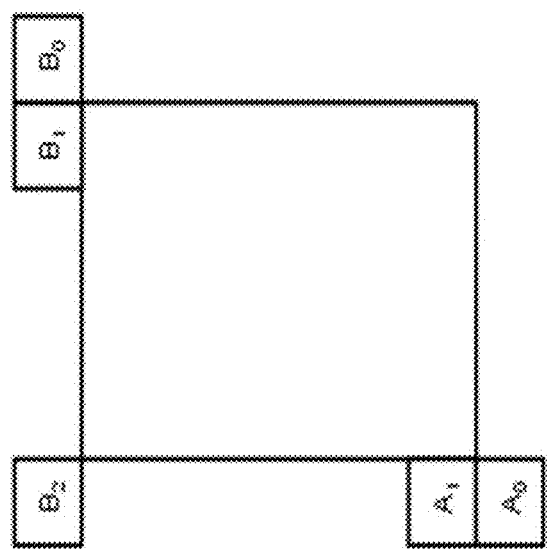
FIG. 14 shows example positions of spatial merge candidates.
Figure 15:
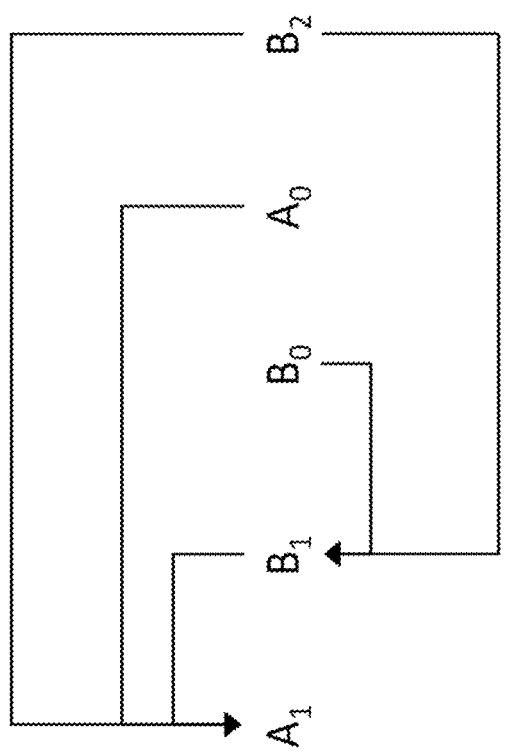
FIG. 15 shows examples of candidate pairs considered for redundancy check of spatial merge candidates.

In the derivation of spatial merge candidates, a maximum of four merge candidates are selected among candidates located in the positions depicted in FIG. 14. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 14 are considered and a candidate is only added to the list if the corresponding candidate used for redundancy check has not the same motion information. Another source of duplicate motion information is the "second PU" associated with partitions different from 2N×2N. As an example, FIG. 15 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position Bi is not considered when the current PU is partitioned as 2N×N.

2.3.2.3. Temporal Candidates Derivation

Figure 17:
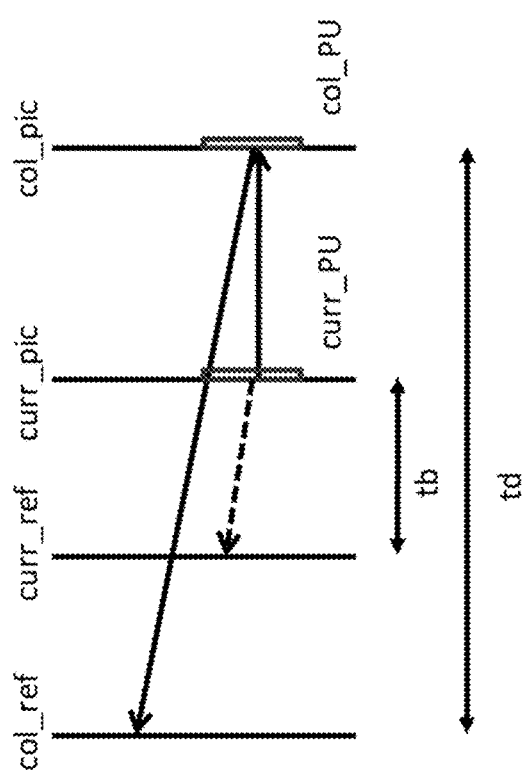
FIG. 17 is an illustration of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header. The scaled motion vector for temporal merge candidate is obtained as illustrated by the dotted line in FIG. 17, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 18:
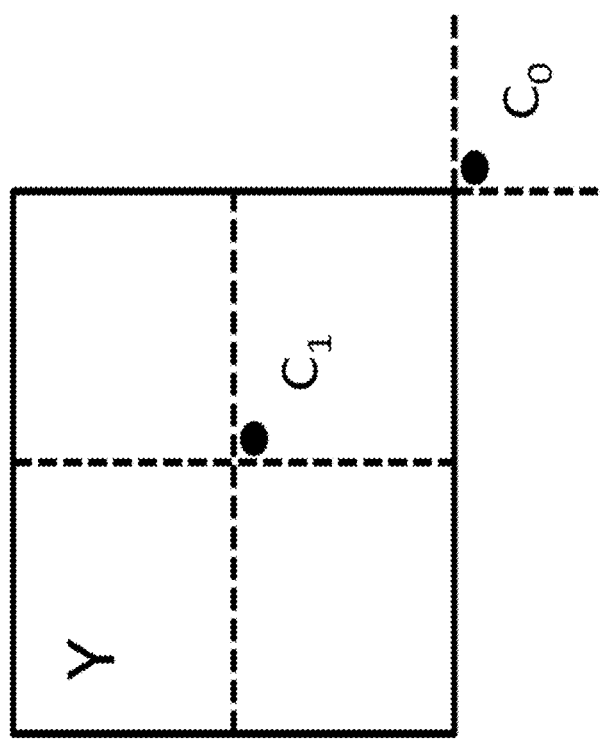
FIG. 18 shows examples of candidate positions for temporal merge candidate, C0 and C1.

In the co-located PU (Y) belonging to the reference frame, the position for the temporal candidate is selected between candidates $C_0$ and $C_1$, as depicted in FIG. 18. If PU at position $C_0$ is not available, is intra coded, or is outside of the current coding tree unit (CTU aka. LCU, largest coding unit) row, position $C_1$ is used. Otherwise, position $C_0$ is used in the derivation of the temporal merge candidate.

2.3.2.4. Additional Candidates Insertion

Figure 19:
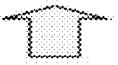
FIG. 19 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 19 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.3.3. AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 20). In the following sections, details about derivation process of motion vector prediction candidate are provided.

2.3.3.1. Derivation of AMVP Candidates

Figure 20:
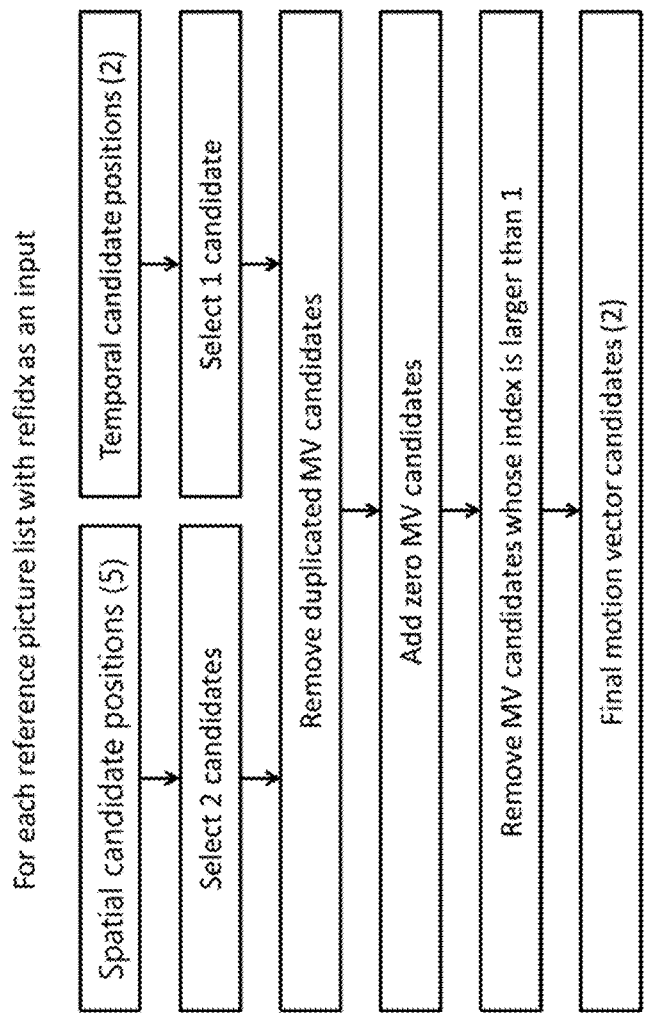
FIG. 20 shows an example derivation process for motion vector prediction candidates.

FIG. 20 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 20.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.3.3.2. Spatial Motion Vector Candidates

Figure 16:
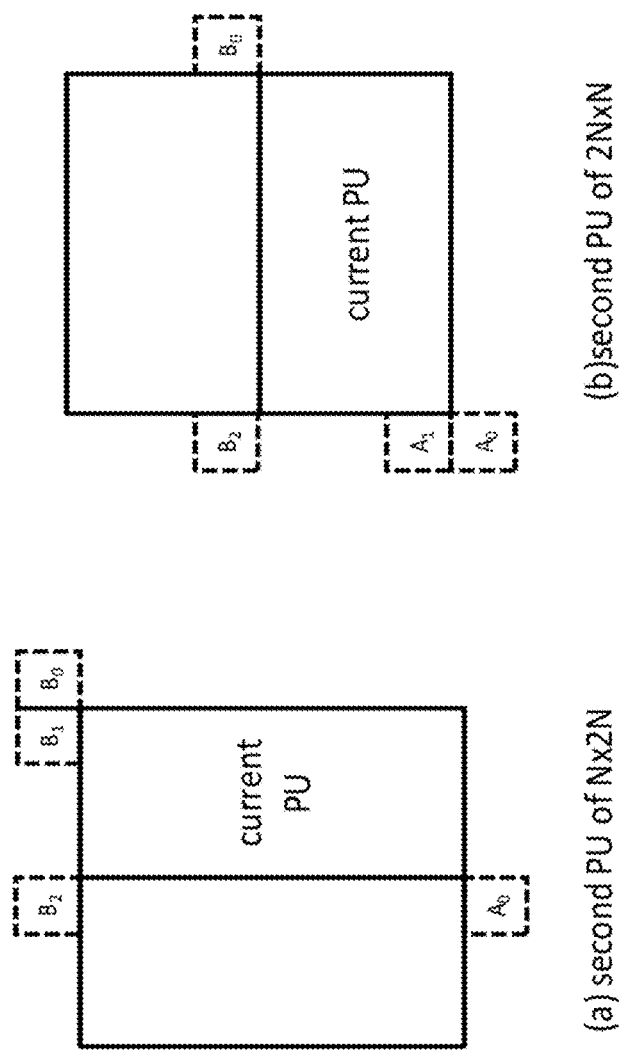
FIG. 16 shows example positions for the second PU of N×2N and 2N×N partitions.

In the derivation of spatial motion vector candidates, a maximum of two candidates are considered among five potential candidates, which are derived from PUs located in positions as depicted in FIG. 16, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)

Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 21:
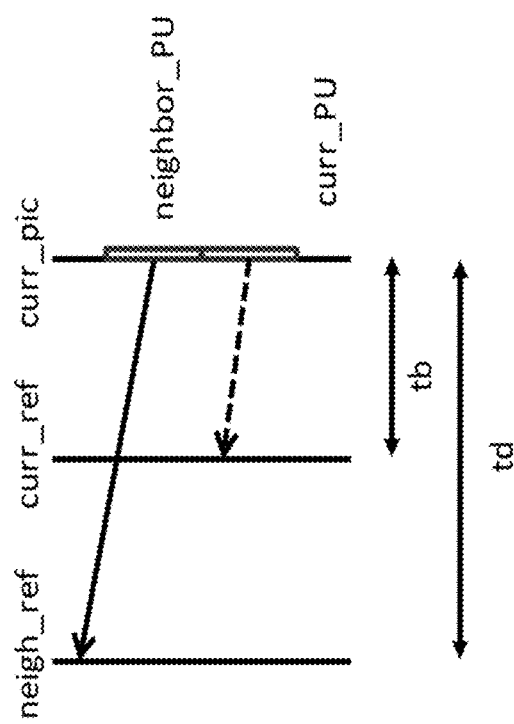
FIG. 21 is an illustration of motion vector scaling for spatial motion vector candidate.

In a spatial scaling process, the motion vector of the neighbouring PU is scaled in a similar manner as for temporal scaling, as depicted as FIG. 21. The main difference is that the reference picture list and index of current PU is given as input; the actual scaling process is the same as that of temporal scaling.

2.3.3.3. Temporal Motion Vector Candidates

Apart for the reference picture index derivation, all processes for the derivation of temporal merge candidates are the same as for the derivation of spatial motion vector candidates (see FIG. 20). The reference picture index is signaled to the decoder.

2.4. Inter Prediction Methods in VVC

There are several new coding tools for inter prediction improvement, such as Adaptive Motion Vector difference Resolution (AMVR) for signaling MVD, Merge with Motion Vector Differences (MMVD), Triangular prediction mode (TPM), Combined intra-inter prediction (CIIP), Advanced TMVP (ATMVP, aka SbTMVP), affine prediction mode, Generalized Bi-Prediction (GBI), Decoder-side Motion Vector Refinement (DMVR) and Bi-directional Optical flow (BIO, a.k.a BDOF).

There are three different merge list construction processes supported in VVC:
1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
2) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6. MMVD, TPM, CIIP rely on the regular merge list.
3) IBC merge list: it is done in a similar way as the regular merge list.

Similarly, there are three AMVP lists supported in VVC:
1) Affine AMVP candidate list
2) Regular AMVP candidate list
3) IBC AMVP candidate list: the same construction process as the IBC merge 2.4.1. Coding Block Structure in VVC In VVC, a Quad-Tree/Binary Tree/Ternary-Tree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

In addition, the CU is set equal to PU and TU, except for blocks coded with a couple of specific coding methods (such as intra sub-partition prediction wherein PU is equal to TU, but smaller than CU, and sub-block transform for inter-coded blocks wherein PU is equal to CU, but TU is smaller than PU).

2.4.2. Affine Prediction Mode

Figure 22:
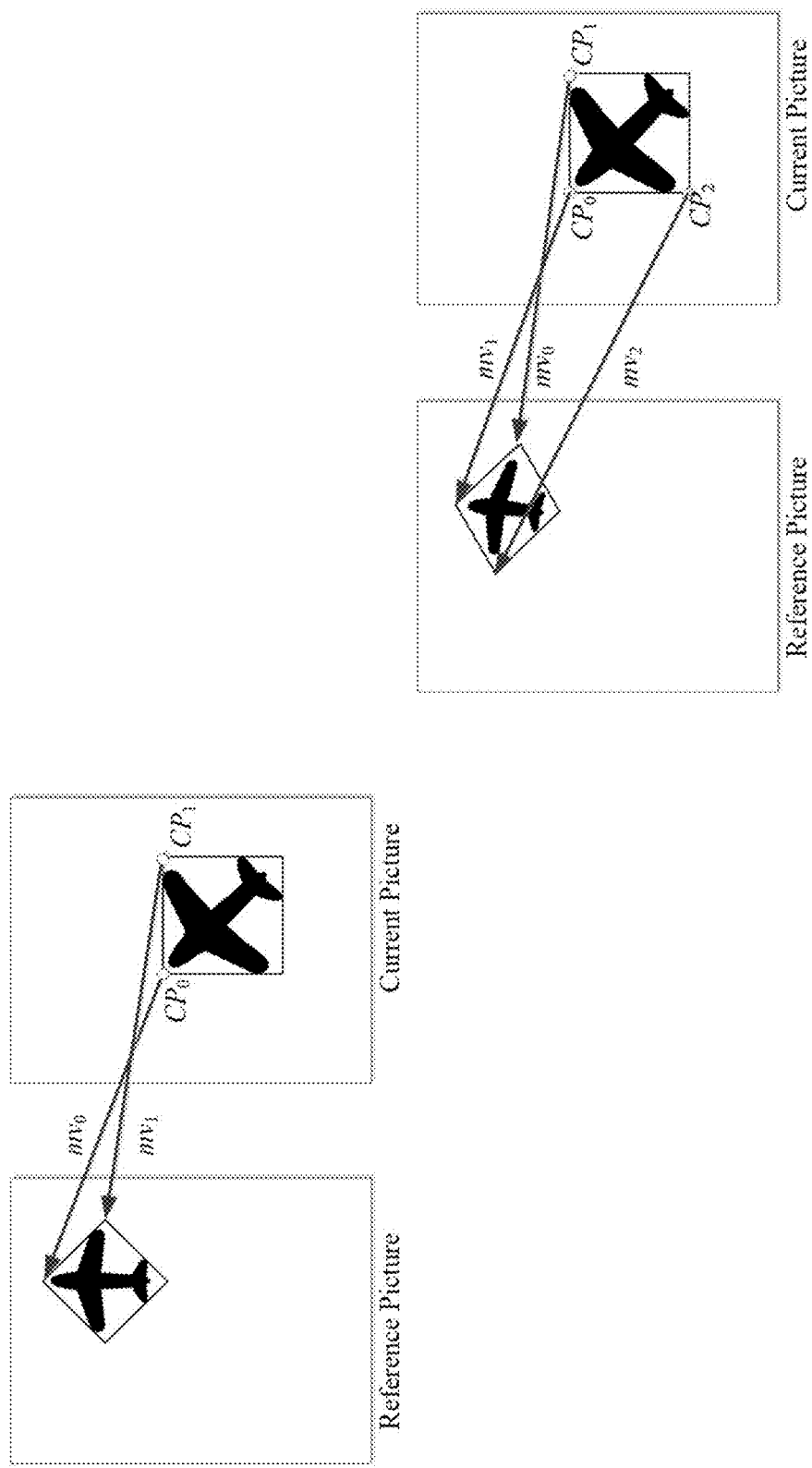
FIG. 22 shows examples of 4 and 6 parameter affine models.

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 22, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 23:
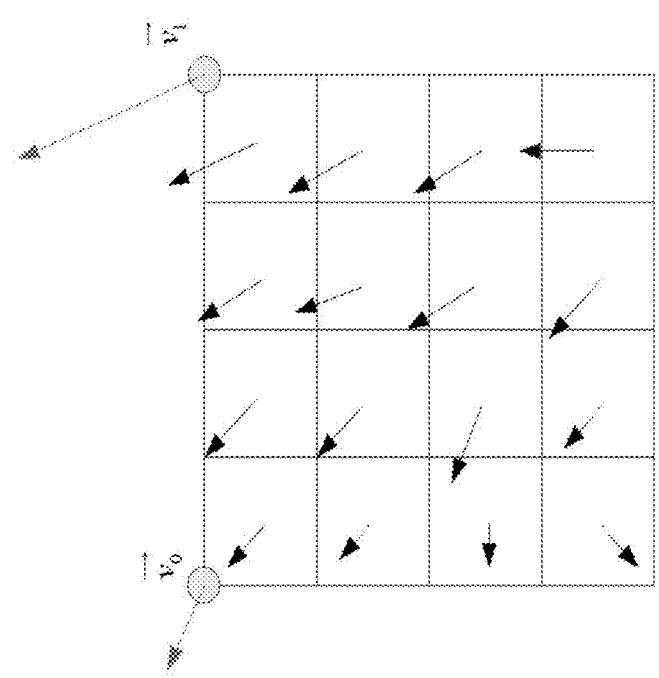
FIG. 23 shows an example of Affine MVF per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 23, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.4.3. MERGE for Whole Block

2.4.3.1. Merge List Construction of Translational Regular Merge Mode

2.4.3.1.1. History-Based Motion Vector Prediction (HMVP)

Different from the merge list design, in VVC, the history-based motion vector prediction (HMVP) method is employed.

Figure 24:
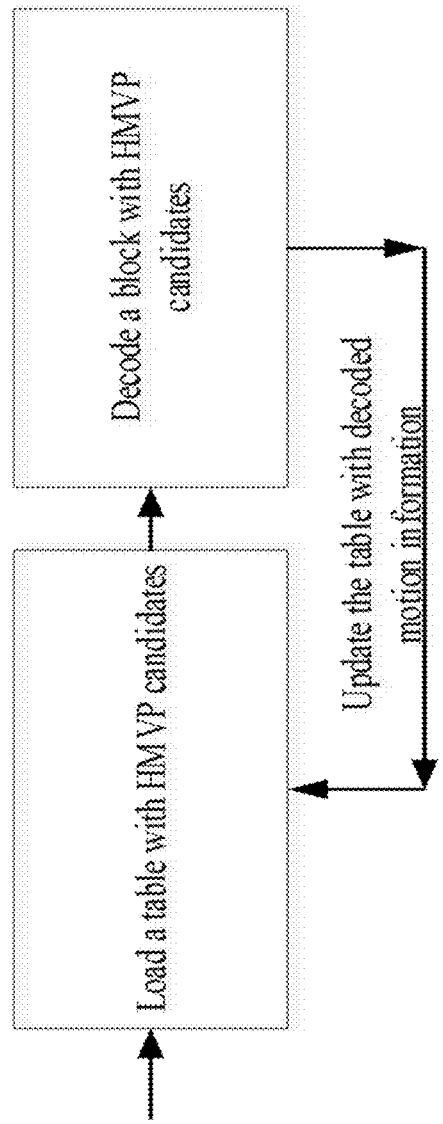
FIG. 24 shows examples of candidates position for affine merge mode.
Figure 25:
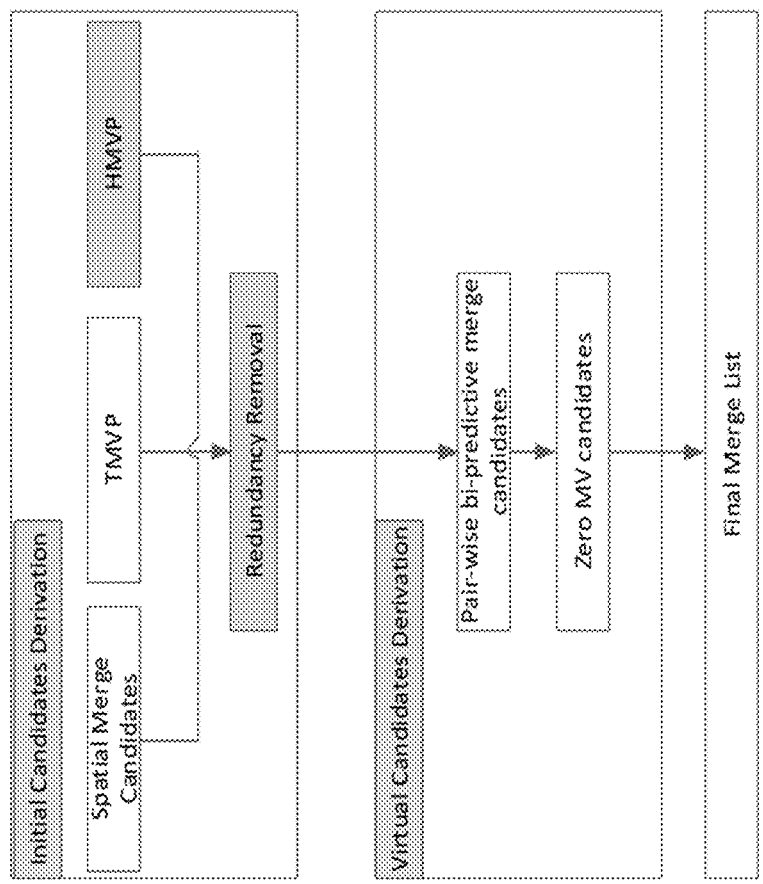
FIG. 25 shows an example of Modified merge list construction process.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new tile/LCU row/a slice. Whenever there is an inter-coded block and non-sub-block, non-TPM mode, the associated motion information is added to the last entry of the table as a new HMVP candidate. The overall coding flow is depicted in FIG. 24.

2.4.3.1.2. Regular Merge List Construction Process

The construction of the regular merge list (for translational motion) can be summarized according to the following sequence of steps:
Step 1: Derivation of spatial candidates
Step 2: Insertion of HMVP candidates
Step 3: Insertion of pairwise average candidates
Step 4: default motion candidates HMVP candidates could be used in both AMVP and merge candidate list construction processes. FIG. 24 depicts the modified merge candidate list construction process (highlighted in Nu). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

It is noted that all the spatial/temporal/HMVP candidate shall be coded with non-IBC mode. Otherwise, it is not allowed to be added to the regular merge candidate list.

HMVP table contains up to 5 regular motion candidates and each of them is unique.

2.4.3.2. Triangular Prediction Mode (TPM)

In VTM4, a triangle partition mode is supported for inter prediction. The triangle partition mode is only applied to CUs that are 8×8 or larger and are coded in merge mode but not in MMVD or CIIP mode. For a CU satisfying these conditions, a CU-level flag is signaled to indicate whether the triangle partition mode is applied or not.

Figure 26:
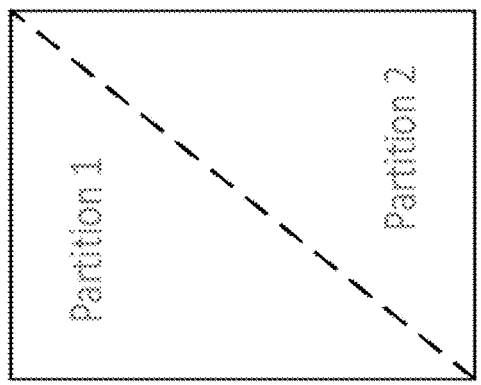
FIG. 26 shows an example of Triangle partition based inter prediction.
Figure 26:
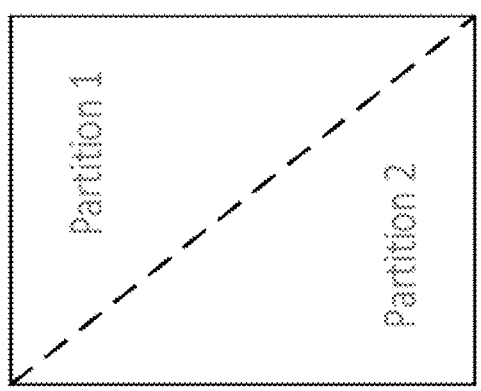
Figure 27:
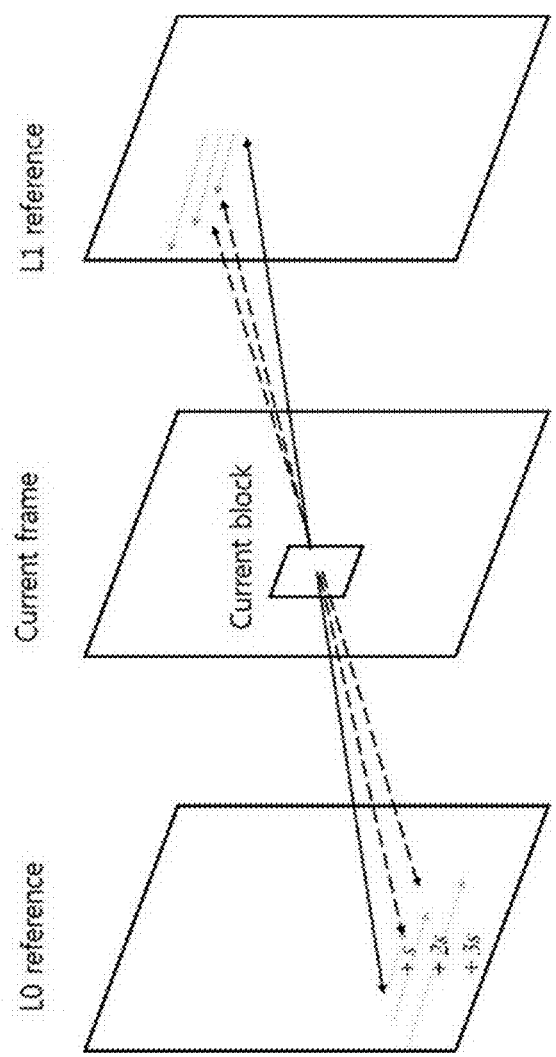
FIG. 27 shows an example of UMVE search process.
Figure 28:
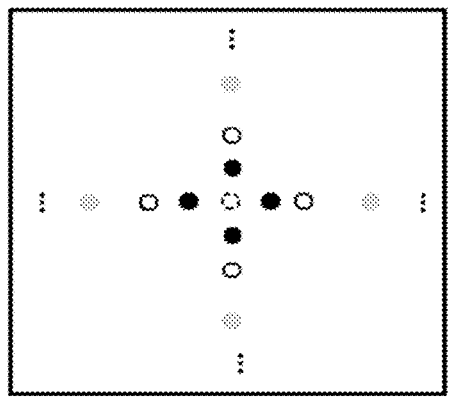
FIG. 28 shows an example of a UMVE search point.
Figure 28:
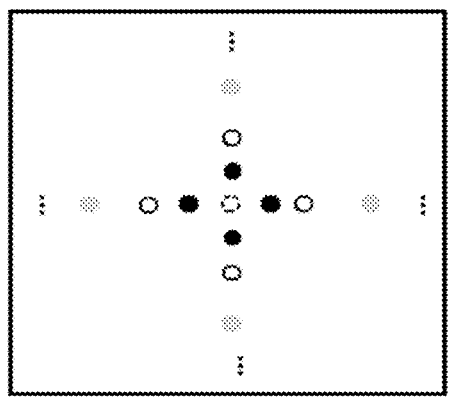

When this mode is used, a CU is split evenly into two triangle-shaped partitions, using either the diagonal split or the anti-diagonal split, as depicted in FIG. 26. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU.

If the CU-level flag indicates that the current CU is coded using the triangle partition mode, a flag indicating the direction of the triangle partition (diagonal or anti-diagonal), and two merge indices (one for each partition) are further signaled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes. Finally, the motion field of a CU predicted using the triangle partition mode is stored in 4×4 units.

The regular merge candidate list is re-used for triangle partition merge prediction with no extra motion vector pruning. For each merge candidate in the regular merge candidate list, one and only one of its L0 or L1 motion vector is used for triangle prediction. In addition, the order of selecting the L0 vs. L1 motion vector is based on its merge index parity. With this scheme, the regular merge list can be directly used.

2.4.3.3. MMVD

Ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 2

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled. Distance index is motion magnitude information. Distance index indicates the pre-defined distance from the starting point information. Pre-defined distance is as follows:

TABLE 3

| Distance IDX | | | | | | | | |
|---|---|---|---|---|---|---|---|---|
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 4

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is also known as Merge with MV Differences (MMVD).

2.4.3.4. Combined Intra-Inter Prediction (CIIP)

Multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from only one intra prediction mode, i.e., planar mode. The weights applied to the prediction block from intra and inter prediction are determined by the coded mode (intra or non-intra) of two neighboring blocks (A1 and B1).

2.4.4. MERGE for Sub-Block-Based Technologies

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes ATMVP candidate and affine merge candidates.

The sub-block merge candidate list is filled with candidates in the following order:
a. ATMVP candidate (maybe available or unavailable);
b. Affine merge lists (including Inherited Affine candidates; and Constructed Affine candidates)
c. Padding as zero MV 4-parameter affine model

2.4.4.1.1. ATMVP (Aka Sub-Block Temporal Motion Vector Predictor, SbTMVP)

Basic idea of ATMVP is to derive multiple sets of temporal motion vector predictors for one block. Each sub-block is assigned with one set of motion information. When an ATMVP merge candidate is generated, the motion compensation is done in 8×8 level instead of the whole block level.

2.4.5. Regular Inter Mode (AMVP)

2.4.5.1. AMVP Motion Candidate List

Similar to the AMVP design in HEVC, up to 2 AMVP candidates may be derived. However, the HMVP candidates may also be added after the TMVP candidate. The HMVP candidates in the HMVP table are traversed in an ascending order of index (i.e., from index equal to 0, the oldest one). Up to 4 HMVP candidates may be checked to find whether its reference picture is the same as the target reference picture (i.e., same POC value).

2.4.5.2. AMVR

In HEVC, motion vector differences (MVDs) (between the motion vector and predicted motion vector of a PU) are signaled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signaled for each CU that has at least one non-zero MVD components.

For a CU that has at least one non-zero MVD components, a first flag is signaled to indicate whether quarter luma sample MV precision is used in the CU. When the first flag (equal to 1) indicates that quarter luma sample MV precision is not used, another flag is signaled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.4.5.3. Symmetric Motion Vector Difference

Symmetric motion vector difference (SMVD) is applied for motion information coding in bi-prediction.

Firstly, in slice level, variables RefIdxSymL0 and RefIdxSymL1 to indicate the reference picture index of list 0/1 used in SMVD mode, respectively, are derived with the following steps as specified in N1001-v2. When at least one of the two variables are equal to −1, SMVD mode shall be disabled.

2.5. Multiple Transform Selection (MTS)

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. Table shows the basis functions of the selected DST/DCT.

TABLE 5

Transform basis functions of DCT-II/ VIII and DSTVII for N-point input

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ <br> where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signaled to indicate whether MTS is applied or not. Here, MTS is applied only for luma. The MTS CU level flag is signaled when the following conditions are satisfied.

Both width and height smaller than or equal to 32

CBF flag is equal to one

If MTS CU flag is equal to zero, then DCT2 is applied in both directions. However, if MTS CU flag is equal to one, then two other flags are additionally signaled to indicate the transform type for the horizontal and vertical directions, respectively. Transform and signaling mapping table as shown in Table 66. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 6

Transform and signaling mapping table

| | | | Intra/inter | |
|---|---|---|---|---|
| MTS_CU_flag | MTS_Hor_flag | MTS_Ver_flag | Horizontal | Vertical |
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

As in HEVC, the residual of a block can be coded with transform skip mode. To avoid the redundancy of syntax coding, the transform skip flag is not signaled when the CU level MTS_CU_flag is not equal to zero. Transform skip is enabled when both block width and height are equal to or less than 4.

2.6. Intra Block Copy

Figure 29:
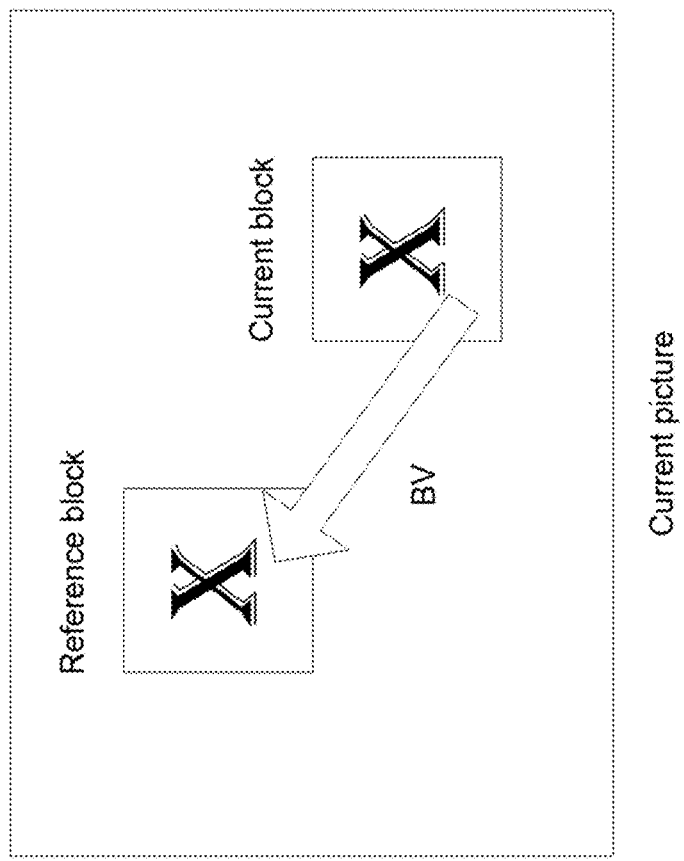
FIG. 29 shows an illustration of Intra block copy.

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 29, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.6.1. IBC in VVC Test Model (VTM4.0)

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.6.1.1. IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in $A_1$, $B_1$, $B_0$, $A_0$ and $B_2$ as depicted in FIG. 14. The order of derivation is A1, B1, B0, A0 and B2. Position B2 is considered only when any PU of position A1, B1, B0, A0 is not available (e.g. because it belongs to another slice or tile) or is not coded with IBC mode. After candidate at position A1 is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.6.1.2. IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
  Check $A_0$, $A_1$ until an available candidate is found.
  Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.6.1.3. Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma mv derivation then the block copy process.

1) The chroma block will be first partitioned into (N>>1)*(M>>1) sub blocks.
2) Each sub block with a top left sample coordinated at (x, y) fetches the corresponding luma block covering the same top-left sample which is coordinated at (2x, 2y).
3) The encoder checks the block vector(bv) of the fetched luma block. If one of the following conditions is satisfied, the by is considered as invalid.
   a. A by of the corresponding luma block is not existing.
   b. The prediction block identified by a by is not reconstructed yet.
   c. The prediction block identified by a by is partially or fully overlapped with the current block.
4) The chroma motion vector of a sub block is set to the motion vector of the corresponding luma sub block.

The IBC mode is allowed at the encoder when all sub blocks find a valid by.

The decoding process of an IBC block is listed below. The part related to chroma mv derivation in a IBC mode is italicized and underlined.

8.6.1 General Decoding Process for Coding Units Coded in IBC Prediction

Inputs to this process are:
- a luma location (xCb, yCb) specifying the top-left sample of the current coding block relative to the top-left luma sample of the current picture,
- a variable cbWidth specifying the width of the current coding block in luma samples,
- a variable cbHeight specifying the height of the current coding block in luma samples,
- a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

The decoding process for coding units coded in ibc prediction mode consists of the following ordered steps:
1. The motion vector components of the current coding unit are derived as follows:
    1. If treeType is equal to SINGLE_TREE or DUAL_TREE_LUMA, the following applies:
        The derivation process for motion vector components as specified in clause 8.6.2.1 is invoked with the luma coding block location (xCb, yCb), the luma coding block width cbWidth and the luma coding block height cbHeight as inputs, and the luma motion vector mvL[0][0] as output.
        When treeType is equal to SINGLE_TREE, the derivation process for chroma motion vectors in clause 8.6.2.9 is invoked with luma motion vector mvL[0][0] as input, and chroma motion vector mvC[0][0] as output.
        The number of luma coding subblocks in horizontal direction numSbX and in vertical direction numSbY are both set equal to 1.
    1. Otherwise, if treeType is equal to DUAL_TREE_CHROMA, the following applies:
        The number of luma coding subblocks in horizontal direction numSbX and in vertical direction numSbY are derived as follows:

num$SbX$=($cb$Width>>2)  (8-886)

num$SbY$=($cb$Height>>2)  (8-887)

The chroma motion vectors mvC[xSbIdx][ySbIdx] are derived as follows for xSbIdx=0 . . . numSbX−1, ySbIdx=0 . . . numSbY−1:
        The luma motion vector mvL[xSbIdx][ySbIdx] is derived as follows:
        The location (xCuY, yCuY) of the collocated luma coding unit is derived as follows:

$xCuY$=$xCb$+$xSbIdx$*4  (8-888)

$yCuY$=$yCb$+$ySbIdx$*4  (8-889)

If CuPredMode[xCuY][yCuY] is equal to MODE_INTRA, the following applies.

$mvL$[$xSbIdx$][$ySbIdx$][0]=0  (8-890)

$mvL$[$xSbIdx$][$ySbIdx$][1]=0  (8-891)

predFlag$L$0[$xSbIdx$][$ySbIdx$]=0  (8-892)

predFlag$L$1[$xSbIdx$][$ySbIdx$]=0  (8-893)

Otherwise (CuPredMode[xCuY][yCuY] is equal to MODE_IBC), the following applies:

$mvL$[$xSbIdx$][$ySbIdx$][0]=$MvL$0[$xCuY$][$yCuY$][0]  (8-894)

$mvL$[$xSbIdx$][$ySbIdx$][1]=$MvL$0[$xCuY$][$yCuY$][1]  (8-895)

predFlag$L$0[$xSbIdx$][$ySbIdx$]=1  (8-896)

predFlag$L$1[$xSbIdx$][$ySbIdx$]=0  (8-897)

The derivation process for chroma motion vectors in clause 8.6.2.9 is invoked with mvL[xSbIdx][ySbIdx] as inputs, and mvC[xSbIdx][ySbIdx] as output.
        It is a requirement of bitstream conformance that the chroma motion vector mvC[xSbIdx][ySbIdx] shall obey the following constraints:
        When the derivation process for block availability as specified in clause 6.4.X [Ed. (BB): Neighbouring blocks availability checking process tbd] is invoked with the current chroma location (xCurr, yCurr) set equal to (xCb/SubWidthC, yCb/SubHeightC) and the neighbouring chroma location (xCb/SubWidthC+(mvC[xSbIdx][ySbIdx][0]>>5), yCb/SubHeightC+(mvC[xSbIdx][ySbIdx][1]>>5)) as inputs, the output shall be equal to TRUE.
        When the derivation process for block availability as specified in clause 6.4.X [Ed. (BB): Neighbouring blocks availability checking process tbd] is invoked with the current chroma location (xCurr, yCurr) set equal to (xCb/SubWidthC, yCb/SubHeightC) and the neighbouring chroma location (xCb/SubWidthC+(mvC[xSbIdx][ySbIdx][0]>>5)+cbWidth/SubWidthC−1, yCb/SubHeightC+(mvC[xSbIdx][ySbIdx][1]>>5)+cbHeight/SubHeightC−1) as inputs, the output shall be equal to TRUE.
        One or both of the following conditions shall be true:

($mvC$[$xSbIdx$][$ySbIdx$][0]>>5)+$xSbIdx$*2+2 is less than or equal to 0.

($mvC$[$xSbIdx$][$ySbIdx$][1]>>5)+$ySbIdx$*2+2 is less than or equal to 0.

2. The prediction samples of the current coding unit are derived as follows:
    If treeType is equal to SINGLE_TREE or DUAL_TREE_LUMA, the prediction samples of the current coding unit are derived as follows:
        The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL[xSbIdx][ySbIdx] with xSbIdx=0 . . . numSbX−1, and ySbIdx=0 . . . numSbY−1, the variable cIdx set equal to 0 as inputs, and the ibc prediction samples (predSamples) that are an (cbWidth)×(cbHeight) array predSamples$_L$ of prediction luma samples as outputs.

Otherwise if treeType is equal to SINGLE_TREE or DUAL_TREE_CHROMA, the prediction samples of the current coding unit are derived as follows:

The decoding process ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC [xSbIdx][ySbIdx] with xSbIdx=0 . . . numSbX−1, and ySbIdx=0 . . . numSbY−1 and the variable cIdx set equal to 1 as inputs, and the ibc prediction samples (predSamples) that are an (cbWidth/2)×(cbHeight/2) array predSamples$_{Cb}$ of prediction chroma samples for the chroma components Cb as outputs.

The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC [xSbIdx][ySbIdx] with xSbIdx=0 . . . numSbX−1, and ySbIdx=0 . . . numSbY−1 and the variable cIdx set equal to 2 as inputs, and the ibc prediction samples (predSamples) that are an (cbWidth/2)×(cbHeight/2) array predSamples$_{Cr}$ of prediction chroma samples for the chroma components Cr as outputs.

3. The variables NumSbX[xCb][yCb] and NumSbY[xCb][yCb] are set equal to numSbX and numSbY, respectively.
4. The residual samples of the current coding unit are derived as follows:

When treeType is equal to SINGLE_TREE or treeType is equal to DUAL_TREE_LUMA, the decoding process for the residual signal of coding blocks coded in inter prediction mode as specified in clause 8.5.8 is invoked with the location (xTb0, yTb0) set equal to the luma location (xCb, yCb), the width nTbW set equal to the luma coding block width cbWidth, the height nTbH set equal to the luma coding block height cbHeight and the variable cIdxset equal to 0 as inputs, and the array resSamples$_L$ as output.

When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 1 as inputs, and the array resSamples$_{Cb}$ as output.

When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 2 as inputs, and the array resSamples$_{Cr}$ as output.

5. The reconstructed samples of the current coding unit are derived as follows:

When treeType is equal to SINGLE_TREE or treeType is equal to DUAL_TREE_LUMA, the picture reconstruction process for a colour component as specified in clause 8.7.5 is invoked with the block location (xB, yB) set equal to (xCb, yCb), the block width bWidth set equal to cbWidth, the block height bHeight set equal to cbHeight, the variable cIdx set equal to 0, the (cbWidth)×(cbHeight) array predSamples set equal to predSamples$_L$ and the (cbWidth)×(cbHeight) array resSamples set equal to resSamples$_L$ as inputs, and the output is a modified reconstructed picture before in-loop filtering.

When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 1, the (cbWidth/2)×(cbHeight/2) array predSamples set equal to predSamples$_{Cb}$ and the (cbWidth/2)×(cbHeight/2) array resSamples set equal to resSamples$_{Cb}$ as inputs, and the output is a modified reconstructed picture before in-loop filtering.

When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 2, the (cbWidth/2)×(cbHeight/2) array predSamples set equal to predSamples$_{Cr}$ and the (cbWidth/2)×(cbHeight/2) array resSamples set equal to resSamples$_{Cr}$ as inputs, and the output is a modified reconstructed picture before in-loop filtering.

2.6.2. Recent Progress for IBC (in VTM5.0)

2.6.2.1. Single BV List

The BV predictors for merge mode and AMVP mode in IBC will share a common predictor list, which consist of the following elements:

2 spatial neighboring positions (A1, B1 as in FIG. 14)

5 HMVP entries

Zero vectors by default

The number of candidates in the list is controlled by a variable derived from the slice header. For merge mode, up to first 6 entries of this list will be used; for AMVP mode, the first 2 entries of this list will be used. And the list conforms with the shared merge list region requirement (shared the same list within the SMR).

In addition to the above-mentioned BV predictor candidate list, it also proposed to simplify the pruning operations between HMVP candidates and the existing merge candidates (A1, B1). In the simplification there will be up to 2 pruning operations since it only compares the first HMVP candidate with spatial merge candidate(s).

2.6.2.1.1. Decoding Process
8.6.2.2 Derivation Process for IBC Luma Motion Vector Prediction This process is only invoked when CuPredMode[xCb][yCb] is equal to MODE_IBC, where (xCb, yCb) specify the top-left sample of the current luma coding block relative to the top-left luma sample of the current picture.

Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma motion vectors in 1/16 fractional-sample accuracy mvL.

The variables xSmr, ySmr, smrWidth, smrHeight, and smrNumHmvpIbcCand are derived as follows:

$$xSmr = IsInSmr[xCb][yCb]?SmrX[xCb][yCb]:xCb \quad (8\text{-}910)$$

$$ySmr = IsInSmr[xCb][yCb]?SmrY[xCb][yCb]:yCb \quad (8\text{-}911)$$

$$smrWidth = IsInSmr[xCb][yCb]?SmrW[xCb][yCb]:cbWidth \quad (8\text{-}912)$$

$$smrHeight = IsInSmr[xCb][yCb]?SmrH[xCb][yCb]:cbHeight \quad (8\text{-}913)$$

$$smrNumHmvpIbcCand = IsInSmr[xCb][yCb]?NumHmvpSmrIbcCand:NumHmvpIbcCand \quad (8\text{-}914)$$

The luma motion vector mvL is derived by the following ordered steps:

1. The derivation process for spatial motion vector candidates from neighbouring coding units as specified in clause 8.6.2.3 is invoked with the luma coding block location (xCb, yCb) set equal to (xSmr, ySmr), the luma coding block width cbWidth, and the luma coding block height cbHeight set equal to smrWidth and smrHeight as inputs, and the outputs being the availability flags availableFlagA$_1$, availableFlagB$_1$ and the motion vectors mvA$_1$ and mvB$_1$.

2. The motion vector candidate list, mvCandList, is constructed as follows:

```
i = 0
if( availableFlagA₁ )
    mvCandList [ i++ ] = mvA₁         (8-915)
if( availableFlagB₁ )
    mvCandList [ i++ ] = mvB₁
```

3. The variable numCurrCand is set equal to the number of merging candidates in the mvCandList.

4. When numCurrCand is less than MaxNumMergeCandand and smrNumHmvpIbcCand is greater than 0, the derivation process of IBC history-based motion vector candidates as specified in 8.6.2.4 is invoked with mvCandList, isInSmr set equal to IsInSmr[xCb][yCb], and numCurrCand as inputs, and modified mvCandList and numCurrCand as outputs.

5. When numCurrCand is less than MaxNumMergeCand, the following applies until numCurrCand is equal to MaxNumMergeCand:
   1. mvCandList[numCurrCand][0] is set equal to 0.
   2. mvCandList[numCurrCand][1] is set equal to 0.
   3. numCurrCand is increased by 1.

6. The variable mvIdx is derived as follows:

$$mvIdx = general\_merge\_flag[xCb][yCb]?merge\_idx[xCb][yCb]:mvp\_l0\_flag[xCb][yCb] \quad (8\text{-}916)$$

7. The following assignments are made:

$$mvL[0] = mergeCandList[mvIdx][0] \quad (8\text{-}917)$$

$$mvL[1] = mergeCandList[mvIdx][1] \quad (8\text{-}918)$$

2.6.2.2. Size Restriction of IBC

In the latest VVC and VTM5, it is proposed to explicitly use syntax constraint for disabling 128×128 IBC mode on top of the current bitstream constraint in the previous VTM and VVC versions, which makes presence of IBC flag dependent on CU size<128×128.

2.6.2.3. Shared Merge List for IBC

To reduce the decoder complexity and support parallel encoding, it proposed to share the same merging candidate list for all leaf coding units (CUs) of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

More specifically, the following may apply:
If the block has luma samples no larger than 32, and split to 2 4×4 child blocks, sharing merge lists between very small blocks (e.g. two adjacent 4×4 blocks) is used.
If the block has luma samples larger than 32, however, after a split, at least one child block is smaller than the threshold (32), all child blocks of that split share the same merge list (e.g. 16×4 or 4×16 split ternary or 8×8 with quad split).

Such a restriction is only applied to IBC merge mode.

2.7. Combined Intra and Inter Prediction(CIIP)

Multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intra$_i$, w_inter$_i$), where i is from 1 to 4 and (w_intra$_1$, w_inter$_1$)=(6, 2), (w_intra$_2$, w_inter$_2$)=(5, 3), (w_intra$_3$, w_inter$_3$)=(3, 5), and (w_intra$_4$, w_inter$_4$)=(2, 6), will be applied to a corresponding region. (w_intra$_1$, w_inter$_1$) is for the region closest to the reference samples and (w_intra$_4$, w_inter$_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

In VTM4, when a CU is coded in merge mode, and if the CU contains at least 64 luma samples (that is, CU width times CU height is equal to or larger than 64), an additional flag is signaled to indicate if the combined inter/intra prediction (CIIP) mode is applied to the current CU.

2.8. Deblocking Scheme in VTM-4.0

In the current VTM, i.e., VTM-4.0, the deblocking scheme is used.

2.8.1. Stronger Deblocking Filter for Luma

The proposal uses a bilinear filter when samples at either one side of a boundary belong to a large block. A sample belonging to a large block is defined as when the width>=32 for a vertical edge, and when height>=32 for a horizontal edge.

The bilinear filter is listed below.

Block boundary samples $p_i$ for i=0 to Sp-1 and qi for j=0 to Sq-1 (pi and qi follow the definitions in HEVC deblocking described above) are then replaced by linear interpolation as follows:

$$p_i'=(f_i*Middle_{s,t}+(64-f_i)*P_s+32)>>6), \text{ clipped to } p_i \pm tcPD_i$$

$$q_j'=(g_j*Middle_{s,t}+(64-g_j)*Q_s+32)>>6), \text{ clipped to } q_j \pm tcPD_j$$

where $tcPD_i$ and $tcPD_j$ term is a position dependent clipping described in Section 2.2.5 and $g_j$, $f_i$, $Middle_{s,t}$, $P_s$ and $Q_s$ are given below:

| Sp, Sq | |
|---|---|
| 7, 7 (p side: 7, q side: 7) | $f_i = 59 - i * 9$, can also be described as f = {59,50,41,32,23,14,5} |
| | $g_j = 59 - j * 9$, can also be described as g = {59,50,41,32,23,14,5} |
| | $Middle_{7,7} = (2 * (p_0 + q_0) + p_1 + q_1 + p_2 + q_2 + p_3 + q_3 + p_4 + q_4 + p_5 + q_5 + p_6 + q_6 + 8) >> 4$ |
| | $P_7 = (p_6 + p_7 + 1) >> 1, Q_7 = (q_6 + q_7 + 1) >> 1$ |
| 7, 3 (p side: 7 q side: 3) | $f_i = 59 - i * 9$, can also be described as f = {59,50,41,32,23,14,5} |
| | $g_j = 53 - j * 21$, can also be described as g = {53,32,11} |
| | $Middle_{7,3} = (2 * (P_0 + q_0) + q_0 + 2 * (q_1 + q_2) + p_1 + q_1 + p_2 + p_3 + p4 + p5 + p6 + 8) >> 4$ |
| | $P_7 = (p_6 + p_7 + 1) >> 1, Q_3 = (q_2 + q_3 + 1) >> 1$ |
| 3,7 (p side: 3 q side: 7) | $g_j = 59 - j * 9$, can also be described as g = {59,50,41,32,23,14,5} |
| | $f_i = 53 - i * 21$, can also be described as f = {53,32,11} |
| | $Middle_{3,7} = (2 * (q_o + p_o) + p_0 + 2 * (p_1 + p_2) + q_1 + p_1 + q_2 + q_3 + q_4 + q_5 + q_6 + 8) >> 4$ |
| | $Q_7 = (q_6 + q_7 + 1) >> 1, P_3 = (p_2 + 3 + 1) >> 1$ |
| 7, 5 (p side: 7 q side: 5) | $g_j = 58 - j * 13$, can also be described as g = {58,45,32,19,6} |
| | $f_i = 59 - i * 9$, can also be described as f = {59,50,41,32,23,14,5} |
| | $Middle7,5 = (2 * (p_0 + q_0 + p_1 + q_1) + q_2 + p_2 + q_3 + p_3 + q_4 + p_4 + q_5 + p_5 + 8) >> 4$ |
| | $Q_5 = (q_4 + q_5 + 1) >> 1, P_7 = (p_6 + p_7 + 1) >> 1$ |
| 5, 7 (p side: 5 q side: 7) | $g_j = 59 - j * 9$, can also be described as g = {59,50,41,32,23,14,5} |
| | $f_i = 58 - i * 13$, can also be described as f = {58,45,32,19,6} |
| | $Middle5,7 = (2 * (q_0 + p_0 + p_1 + q_1) + q_2 + p_2 + q_3 + p_3 + q_4 + p_4 + q_5 + p_5 + 8) >> 4$ |
| | $Q_7 = (q_6 + q_5 + 1) >> 1, P_5 = (p_4 + p_5 + 1) >> 1$ |
| 5, 5 (p side: 5 q side: 5) | $g_j = 58 - j * 13$, can also be described as g = {58,45,32,19,6} |
| | $f_i = 58 - i * 13$, can also be described as f = {58,45,32,19,6} |
| | $Middle5,5 = (2 * (q_0 + p_0 + p_1 + q_1 + q_2 + p_2) + q_3 + p_3 + q_4 + p_4 + 8) >> 4$ |
| | $Q_5 = (q_4 + q_5 + 1) >> 1, P_5 = (p_4 + p_5 + 1) >> 1$ |
| 5, 3 (p side: 5 q side: 3) | $g_j = 53 - j * 21$, can also be described as g = {53,32,11} |
| | $f_i = 58 - i * 13$, can also be described as f = {58,45,32,19,6} |
| | $Middle5,3 = (q_0 + p_0 + p_1 + q_1 + q_2 + p_2 + q_3 + p_3 + 4) >> 3$ |
| | $Q_3 = (q_2 + q_3 + 1) >> 1, P_5 = (p_4 + p_5 + 1) >> 1$ |
| 3, 5 (p side: 3 q side: 5) | $g_j = 58 - j * 13$, can also be described as g = {58,45,32,19,6} |
| | $f_i = 53 - i * 21$, can also be described as f = {53,32,11} |
| | $Middle3,5 = (q_0 + p_0 + p_1 + q_1 + q_2 + p_2 + q_3 + p_3 + 4) >> 3$ |
| | $Q_5 = (q_4 + q_5 + 1) >> 1, P_3 = (p_2 + p_3 + 1) >> 1$ |

2.8.2. Deblocking Control for Luma

The deblocking decision process is described in this sub-section.

Wider-stronger luma filter is filters are used only if all of the Condition 1, Condition 2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk=((edge type is vertical and $p_0$
        belongs to CU with width>=32)||(edge type is
        horizontal and $p_0$ belongs to CU with
        height>=32))?TRUE:FALSE bSideQisLargeBlk=((edge type is vertical and $q_0$
        belongs to CU with width>=32)||(edge type is
        horizontal and $q_0$ belongs to CU with
        height>=32))?TRUE:FALSE Based on bSidePisLargeBlk and bSideQisLargeBlk, the condition 1 is defined as follows.

Condition 1=(bSidePisLargeBlk||bSidePisLargeBlk)?
        TRUE:FALSE

Next, if Condition 1 is true, the condition 2 will be further checked. First, the following variables are derived:
dp0, dp3, dq0, dq3 are first derived as in HEVC
if (p side is greater than or equal to 32)

$$dp0=(dp0+Abs(p_{5,0}-2*p_{4,0}+p_{3,0})+1)>>1$$

$$dp3=(dp3+Abs(p_{5,3}-2*p_{4,3}+p_{3,3})+1)>>1$$

if (q side is greater than or equal to 32)

$$dq0=(dq0+Abs(q_{5,0}-2*q_{4,0}+q_{3,0})+1)>>1$$

$$dq3=(dq3+Abs(q_{5,3}-2*q_{4,3}+q_{3,3})+1)>>1$$

dpq0, dpq3, dp, dq, d are then derived as in HEVC.
Then the condition 2 is defined as follows.

Condition 2=$(d<\beta)$?TRUE:FALSE

Where d=dp0+dq0+dp3+dq3, as shown in section 2.1.4.

If Condition 1 and Condition 2 are valid it is checked if any of the blocks uses sub-blocks:

```
If(bSidePisLargeBlk)
    If(mode block P == SUBBLOCKMODE)
        Sp =5
    else
        Sp =7
else
    Sp = 3
If(bSideQisLargeBlk)
    If(mode block Q == SUBBLOCKMODE)
        Sq =5
    else
        Sq =7
else
    Sq = 3
```

Finally, if both the Condition 1 and Condition 2 are valid, the proposed deblocking method will check the condition 3 (the large block Strong filter condition), which is defined as follows.

In the Condition 3 StrongFilterCondition, the following variables are derived:

```
dpq is derived as in HEVC.
sp3 = Abs( p3 − p0 ), derived as in HEVC
if (p side is greater than or equal to 32)
    if(Sp==5)
        sp3 = ( sp3 + Abs( p5 − p3 ) + 1 ) >> 1
    else
        sp3 = ( sp3 + Abs( p7 − p3 ) + 1 ) >> 1
sq3 = Abs( q0 − q3 ), derived as in HEVC
if (q side is greater than or equal to 32)
    If(Sq==5)
        sq3 = ( sq3 + Abs( q5 − q3 ) + 1 ) >> 1
    else
        sq3 = ( sq3 + Abs( q7 − q3 ) + 1 ) >> 1
As in HEVC derive, StrongFilterCondition =
(dpq is less than ( β >> 2), sp3 + sq3 is less than ( 3*β >> 5),
and Abs( p0 − q0 ) is less than ( 5 * tC + 1 ) >> 1) ? TRUE : FALSE
```

2.8.3. Strong Deblocking Filter for Chroma

The following strong deblocking filter for chroma is defined:

$$p_2'=(3*p_3+2*p_2+p_1+p_0+q_0+4)>>3$$

$$p_1'=(2*p_3+p_2+2*p_1+p_0+q_0+q_1+4)>>3$$

$$p_0'=(p_3+p_2+p_1+2*p_0+q_0+q_1+q_2+4)>>3$$

The proposed chroma filter performs deblocking on a 4×4 chroma sample grid.

2.8.4. Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one are basically the same as for HEVC luma deblocking decision, which are on/off decision and strong filter decision, respectively.

In the first decision, boundary strength (bS) is modified for chroma filtering as shown in Table 1. The conditions in Table 1 are checked sequentially. If a condition is satisfied, then the remaining conditions with lower priorities are skipped.

TABLE 7

| | Modified boundary strength | | | |
|---|---|---|---|---|
| Priority | Conditions | Y | U | V |
| 5 | At least one of the adjacent blocks is intra | 2 | 2 | 2 |
| 4 | At least one of the adjacent blocks has non-zero transform coefficients | 1 | 1 | 1 |
| 3 | Absolute difference between the motion vectors that belong to the adjacent blocks is greater than or equal to one integer luma sample | 1 | N/A | N/A |
| 2 | Motion prediction in the adjacent blocks refers to vectors is different | 1 | N/A | N/A |
| 1 | Otherwise | 0 | 0 | 0 |

Chroma deblocking is performed when bS is equal to 2, or bS is equal to 1 when a large block boundary is detected.

The second and third condition is basically the same as HEVC luma strong filter decision as follows.

In the second condition:

d is then derived as in HEVC luma deblocking.

The second condition will be TRUE when d is less than β.

In the third condition StrongFilterCondition is derived as follows:

dpq is derived as in HEVC.

$sp_3 = Abs(p_3 - p_0)$, derived as in HEVC $sq_3 = Abs(q_0 - q_3)$, derived as in HEVC As in HEVC derive, StrongFilterCondition=(dpq is less than (β>>2), $sp_3 + sq_3$ is less than (β>>3), and $Abs(p_0 - q_0)$ is less than (5*$t_C$+1)>>1)

2.8.5. Position Dependent Clipping

The proposal also introduces a position dependent clipping tcPD which is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with proposed asymmetrical filter, depending on the result of decision making process described in Section 2.2, position dependent threshold table is selected from Tc7 and Tc3 tables that are provided to decoder as a side information:

$Tc7 = \{6,5,4,3,2,1,1\};$ $Tc3 = \{6,4,2\};$ $tcPD = (SP == 3)?Tc3:Tc7;$ $tcQD = (SQ == 3)?Tc3:Tc7;$

For the P or Q boundaries being filtered with a short symmetrical filter, position dependent threshold of lower magnitude is applied:

$Tc3 = \{3,2,1\};$

Following defining the threshold, filtered $p'_i$ and $q'_i$ sample values are clipped according to tcP and tcQ clipping values:

$p''_i = \text{clip3}(p'_i + tcP_i, p'_i - tcP_i, p'_i);$ $q''_j = \text{clip3}(q'_j + tcQ_j, q'_j - tcQ_j, q'_j);$ where $p'_i$ and $q'_i$ are filtered sample values, $p''_i$ and $q''_j$ are output sample value after the clipping and $tcP_i$, $tcP_i$ are clipping thresholds that are derived from the VVC tc parameter and tcPD and tcQD. Term clip3 is a clipping function as it is specified in VVC.

2.8.6. Sub-Block Deblocking Adjustment

To enable parallel friendly deblocking using both long filters and sub-block deblocking the long filters is restricted to modify at most 5 samples on a side that uses sub-block deblocking (AFFINE or ATMVP) as shown in the luma control for long filters. Additionally, the sub-block deblocking is adjusted such that that sub-block boundaries on an 8×8 grid that are close to a CU or an implicit TU boundary is restricted to modify at most two samples on each side.

Following applies to sub-block boundaries that not are aligned with the CU boundary.

```
If(mode block Q == SUBBLOCKMODE && edge!=0){
    if (!(implicitTU && (edge == (64 / 4))))
        if (edge == 2 || edge == (orthogonalLength - 2) ||
            edge == (56 / 4) || edge == (72 / 4))
            Sp = Sq = 2;
        else
            Sp = Sq = 3;
    else
        Sp = Sq = bSideQisLargeBlk ? 5:3
}
```

Where edge equal to 0 corresponds to CU boundary, edge equal to 2 or equal to orthogonalLength-2 corresponds to sub-block boundary 8 samples from a CU boundary etc. Where implicit TU is true if implicit split of TU is used.

2.8.7. Restriction to 4 CTU/2 CTU Line Buffers for Luma/Chroma

Filtering of horizontal boundary is limiting Sp=3 for luma, Sp=1 and Sq=1 for chroma, when the horizontal boundary is aligned with the CTU boundary.

2.9. Palette Mode in HEVC Screen Content Coding Extensions (HEVC-SCC)

Figure 32:
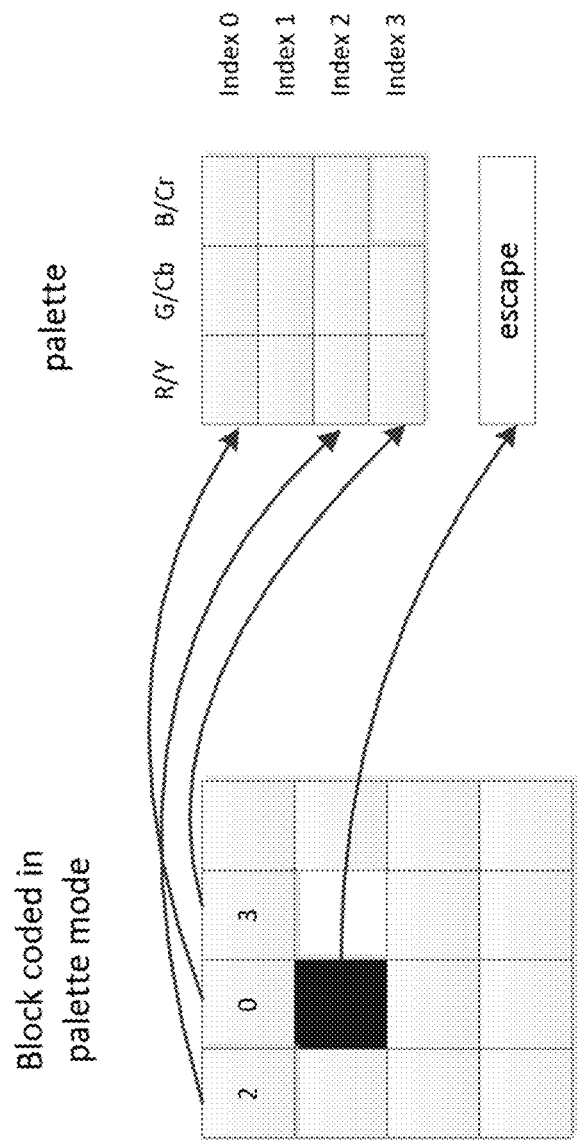
FIG. 32 shows an example of a block coded in palette mode.

The basic idea behind a palette mode is that the samples in the CU are represented by a small set of representative colour values. This set is referred to as the palette. It is also possible to indicate a sample that is outside the palette by signaling an escape symbol followed by (possibly quantized) component values. This is illustrated in FIG. 32.

In the palette mode in HEVC-SCC, a predictive way is used to code the palette and index map.

2.9.1. Coding of the Palette Entries

For coding of the palette entries, a palette predictor is maintained. The maximum size of the palette as well as the palette predictor is signaled in the SPS. In HEVC-SCC, a palette_predictor_initializer_present_flag is introduced in the PPS. When this flag is 1, entries for initializing the palette predictor are signaled in the bitstream. The palette predictor is initialized at the beginning of each CTU row, each slice and each tile. Depending on the value of the palette_predictor_initializer_present_flag, the palette predictor is reset to 0 or initialized using the palette predictor intializer entries signaled in the PPS. In HEVC-SCC, a palette predictor initializer of size 0 was enabled to allow explicit disabling of the palette predictor initialization at the PPS level.

Figure 33:
FIG. 33 shows an example of usage of palette predictor to signal palette entries.

For each entry in the palette predictor, a reuse flag is signaled to indicate whether it is part of the current palette. This is illustrated in FIG. 33. The reuse flags are sent using run-length coding of zeros. After this, the number of new palette entries are signaled using exponential Golomb code of order 0. Finally, the component values for the new palette entries are signaled.

2.9.2. Coding of Palette Indices

Figure 34:
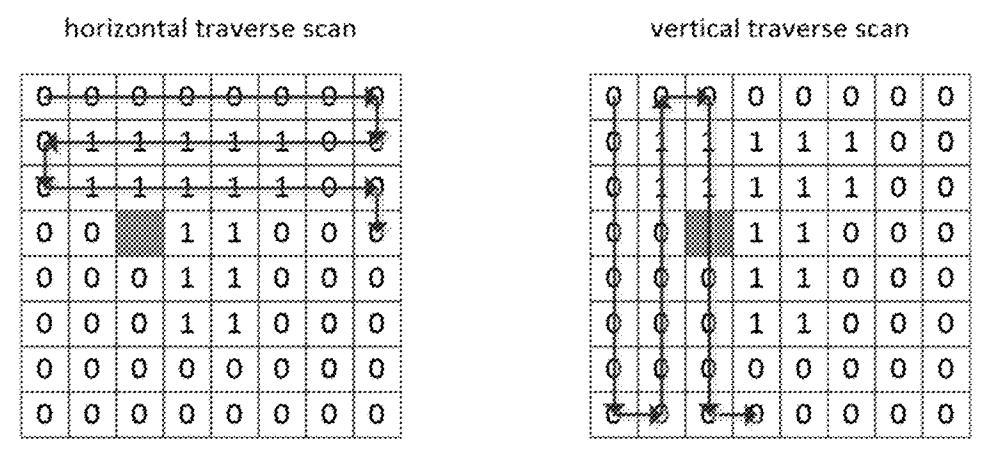

The palette indices are coded using horizontal and vertical traverse scans as shown in FIG. 34. The scan order is explicitly signaled in the bitstream using the palette_transpose_flag. For the rest of the subsection it is assumed that the scan is horizontal.

Figure 35:
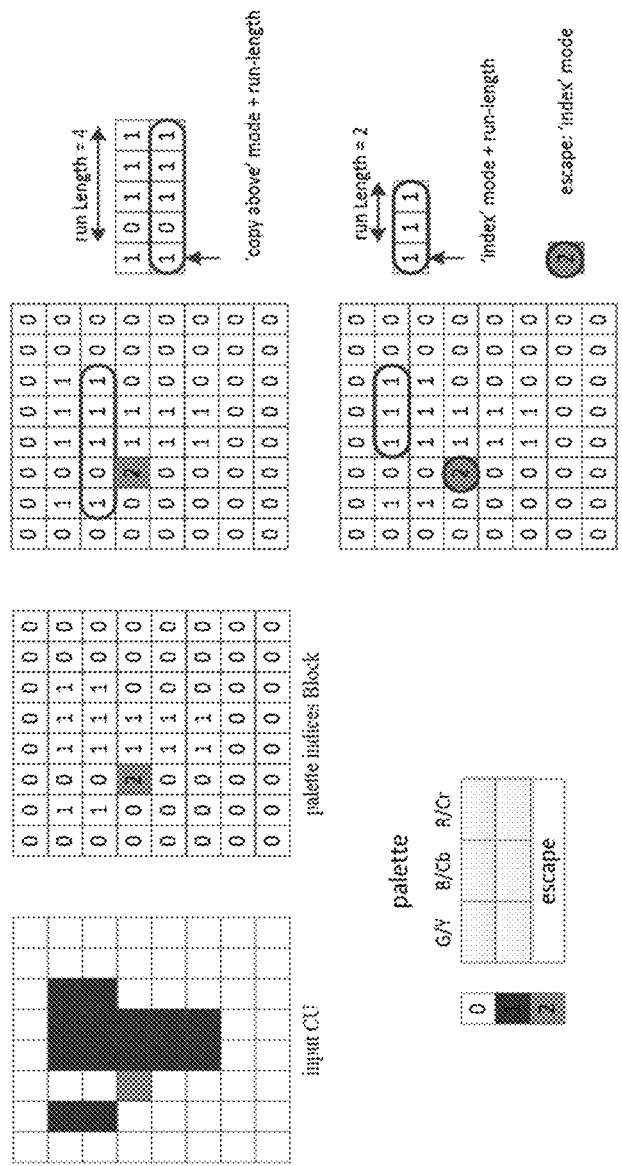
FIG. 35 shows an example of coding of palette indices.

The palette indices are coded using two main palette sample modes: 'INDEX' and 'COPY_ABOVE'. As explained previously, the escape symbol is also signaled as an 'INDEX' mode and assigned an index equal to the maximum palette size. The mode is signaled using a flag except for the top row or when the previous mode was 'COPY_ABOVE'. In the 'COPY_ABOVE' mode, the palette index of the sample in the row above is copied. In the 'INDEX' mode, the palette index is explicitly signaled. For both 'INDEX' and 'COPY_ABOVE' modes, a run value is signaled which specifies the number of subsequent samples that are also coded using the same mode. When escape symbol is part of the run in 'INDEX' or 'COPY_ABOVE' mode, the escape component values are signaled for each escape symbol. The coding of palette indices is illustrated in FIG. 35.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

3. Limitations of Present Day Technologies

The current design may have the following problems:
1. When separate coding tree for luma and chroma is used, a Chroma block/sub-block may not able to derive a BV.
2. The coding efficiency may be improved by combing IBC and intra coding mode.
3. The coding efficiency may be improved when performing the IBC mode at sub block level for a luma block.

4. Listing of Example Techniques and Embodiments

The detailed inventions below should be considered as examples to explain general concepts. These inventions should not be interpreted in a narrow way. Furthermore, these inventions can be combined in any manner.

It is noted that the term "IBC" below may refer to "IBC" introduced in the background, or it may refer to any technology that may generate prediction signal from samples in the current video unit (e.g., slice/tile/brick/tile group/picture) excluding the intra prediction methods described in 2.2.
  1. Intra prediction and IBC prediction may be both used to generate prediction for a block.
     a. In one example, a subset of the samples in the block may use intra prediction signals as prediction and the remaining may use IBC prediction signals as prediction.
        i. In one example, for a sample with a block vector pointing to an invalid reference area, intra prediction may be used as prediction for the sample.
           1) Alternatively, for a sample with a valid block vector, IBC prediction may be used as prediction for the sample.
        ii. In one example, for samples in the current block that are close to neighboring blocks' reconstruction samples, intra prediction may be used as prediction for the sample.
           1) Alternatively, for samples in the current block that are far from neighboring blocks' reconstruction samples, IBC prediction may be used as prediction for the sample.
        iii. In one example, for a chroma sub-block, if its collocated luma sub-block is coded in IBC mode, the prediction for the chroma sub-block may be from IBC prediction.
        iv. In one example, for a chroma sub-block, if its collocated luma sub-block is coded in IBC mode and the BV derived from the luma sub-block is valid for the chroma sub-block, the prediction for the chroma sub-block may be from IBC prediction.
        v. In one example, for a chroma sub-block, if its collocated luma sub-block is coded in intra mode, the prediction for the chroma sub-block may be from intra prediction.
        vi. In one example, for a chroma block, if a valid BV can be derived from corresponding luma component, the prediction for the chroma sub-block may be from IBC prediction.
           1) For example, the BV for the chroma component from the corresponding luma component may be derived as the BV associated with a luma sample collocated with a sample of the chroma block. In one example, the sample of the chroma block may be at the center of the chroma block. In another example, the sample of the chroma block may be at the top-left of the chroma block
     b. A block's prediction may be generated by weighted averaging intra prediction and IBC prediction signals.
        i. In one example, one or multiple sets of weights may be predefined to combine intra prediction and IBC prediction.
        ii. In one example, IBC may be treated as an inter mode and CIIP weights may be applied to combine intra prediction and IBC prediction.
        iii. In one example, the weights on a sample may be dependent on the relative position of the sample within current block.
        iv. In one example, the weights may be dependent on the coded information of current block, such as intra prediction mode, block dimensions, color component, color formats, etc.
     c. Similarly, predictions from IBC and one or multiple other modes excluding IBC (e.g., palette mode, BDPCM) may be all used for generating final prediction block of a block.
     d. Indication of usage of the above methods and/or the weighting values may be signaled in sequence/picture/slice/tile group/tile/brick/CTU/CTB/CU/PU/TU/other video unit-level or derived on-the-fly.
        i. In one example, the above method may be treated as a special IBC mode. That is, if one block is coded as IBC mode, further indications of using conventional IBC method or above method may be signaled or derived.

ii. In one example, the above method may be treated as a special intra mode. That is, if one block is coded as intra mode, further indications of using conventional intra method or above method may be signaled or derived.

iii. In one example, the above method may be treated as a new prediction mode. That is, the allowed modes such as intra, inter and IBC, may be further extended to include this new mode.

2. A luma block may be split into one or multiple sub-blocks and at least the prediction block of a first sub-block is generated with the IBC mode and at least the prediction block of a second sub-block is generated using other method(s) excluding IBC mode.

a. In one example, all IBC-coded sub-blocks may share the same BV.
   i. Alternatively, different IBC-coded sub-block may have different BVs.
b. In one example, only one B V may be signaled/derived from bitstream for the block.
   i. Alternatively, multiple BVs may be signaled/derived to get the BVs for all IBC-coded sub-blocks.
c. In one example, sub-block size may be fixed for all sub-blocks within the block, e.g., 4×4 or the minimum unit for storing motion information/B V or minimum unit for allowing IBC mode.
   i. Alternatively, different sub-blocks may be assigned with different dimensions.
d. In one example, IBC enabling/disabling may be performed at sub-block level instead of whole block level.
e. In one example, for a luma block, a block vector (BV) may be valid for some sub-blocks and invalid for some other sub-blocks.
   i. In one example, a BV may be invalid if the prediction block indicated by the BV is not fully reconstructed.
   ii. In one example, a BV may be invalid if the prediction block indicated by the BV is outside the current picture/slice/tile group/brick.
   iii. In one example, a BV may be invalid if the prediction block indicated by the BV is overlapped with the current block.
   iv. In one example, for the sub-block with the BV marked as valid, the prediction signal of the sub-block may be generated using the IBC mode.
   v. In one example, for the sub-block with the BV marked as invalid, the prediction signal of the sub-block may be generated using other modes excluding IBC.
      1) In one example, the intra prediction may be employed to generate predictions for the sub-blocks with invalid block/motion vectors.
      2) In one example, the palette mode may be employed to generate predictions for the sub-blocks with invalid block/motion vectors.

3. Prediction of one or multiple color components may be from intra prediction and prediction of the other color components of one video unit (e.g., coding unit/prediction unit/transform unit) may be from IBC prediction.

a. In one example, IBC may be applied to luma and intra prediction may be applied to chroma.

i. Alternatively, intra prediction may be applied to luma and IBC may be applied to chroma.

4. When the above methods are used, intra prediction process may be modified.
a. In one example, the PDPC mode may be disabled when generating the intra prediction signal.
b. In one example, the reference samples smoothing may be disabled when generating the intra prediction signal.

Figure 30:
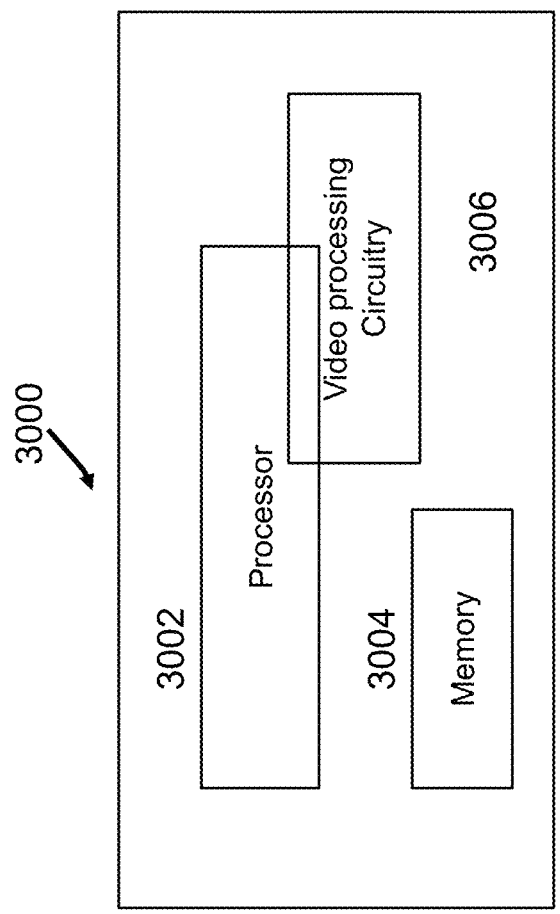
FIG. 30 is a block diagram of a video processing apparatus.
Figure 31:
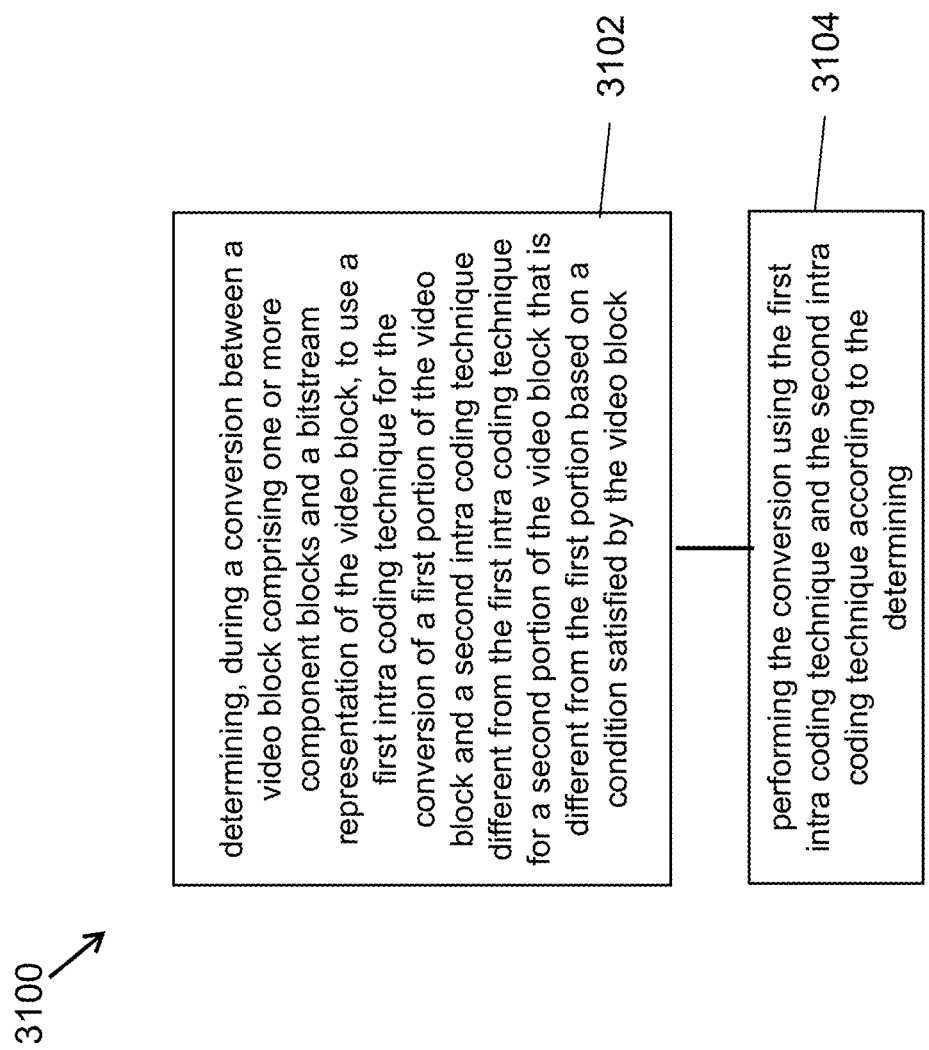
FIG. 31 is a flowchart of an example method of video processing.

5. When the above methods are used, intra prediction mode may be derived or signaled.
a. In one example, a certain most probable mode (MPM) mode may be used to generate intra prediction.
   i. In one example, the $1^{st}$ MPM mode may be used to generate intra prediction.
   ii. In one example, the $1^{st}$ available MPM mode may be used to generate intra prediction.
   iii. In one example, the $1^{st}$ angular MPM mode may be used to generate intra prediction.
   iv. In one example, PLANAR or DC mode may be used to generate intra prediction.
b. In one example, for chroma block, DM mode may be used to generate intra prediction.
   i. Alternatively, DC mode may be used to generate intra prediction for chroma block.
   ii. Alternatively, PLANAR mode may be used to generate intra prediction for chroma block.
   iii. Alternatively, VER mode may be used to generate intra prediction for chroma block
   iv. Alternatively, HOR mode may be used to generate intra prediction for chroma block
   v. Alternatively, CCLM modes (such as LM and/or LM-L and/or LM-T) may be used to generate intra prediction for a chroma block.
c. In one example, for a luma block, DC mode may be used to generate intra prediction.
   i. Alternatively, diagonal mode may be used to generate intra prediction for a luma block.
   ii. Alternatively, anti-diagonal mode may be used to generate intra prediction for a luma block.
   iii. Alternatively, PLANAR mode may be used to generate intra prediction for a luma block.
   iv. Alternatively, VER mode may be used to generate intra prediction for a luma block.
   v. Alternatively, HOR mode may be used to generate intra prediction for a luma block.
d. In one example, one flag may be sent to indicate whether the intra prediction is horizontal mode or vertical mode.
e. In one example, an index may be sent to indicate which MPM mode may be used to generate intra prediction for chroma block.
f. In one example, a set of intra modes may be checked in order, to derive an intra mode to generate intra prediction.
g. In one example, the intra mode associated with current block may be used as a MPM of the successively coded blocks.
   i. Alternatively, such a block may be treated in a similar way as normal IBC mode, i.e., it is not associated with any intra prediction modes.
h. In one example, the intra mode associated with current block may be used to derive the DM mode for the corresponding chroma block.
   i. Alternatively, the DM mode for the corresponding chroma block may be set to default mode if the corresponding luma block is coded with proposed methods (e.g., bullet 1-3).
  i. In one example, when the proposed methods (e.g., bullet 1-3) are applied, during the filtering process (such as deblocking filtering or ALF), such blocks may be treated as conventional IBC coded blocks.
    i. Alternatively, such blocks may be treated as conventional intra coded blocks.
    ii. Alternatively, such blocks may be treated as a new coding mode different from existing IBC or intra mode.
      1) Alternatively, furthermore, how to apply filtering process/whether to apply filtering process may depend on the usage of proposed methods.
6. When the above methods are used, intra prediction may be generated by copying neighboring reconstructed samples.
  a. In one example, the left column to the current block may be copied to generate intra prediction.
    i. In one example, the copying may be performed horizontally.
  b. In one example, the above row to the current block may be copied to generate intra prediction.
    i. In one example, the copying may be performed vertically.
  c. In one example, the left column to the current block, when available, may be copied to generate intra prediction, otherwise, the above row to the current block may be copied to generate intra prediction.
  d. In one example, the above row to the current block, when available, may be copied to generate intra prediction, otherwise, the left column to the current block may be copied to generate intra prediction.
  e. In one example, the prediction samples in the left column or the above row to the current sub block may be copied to generate intra prediction.
    i. In one example, the above method may be applied if the prediction samples in the left column or the above row to the current sub block are in a sub-block predicted by IBC method.
7. When the above methods are used, some coding technologies on intra blocks may be disallowed.
  a. In one example, some intra prediction modes may be disallowed.
    i. In one example, ISP may be disallowed.
    ii. In one example, MRL may be disallowed.
    iii. In one example, matrix-based intra prediction may be disallowed.
  b. In one example, Multiple Transform Set (MTS) may be disallowed.
  c. In one example, Reduced Secondary Transform (RST) may be disallowed.
8. When the above methods are used, IBC mode and/or block vectors(BV) may be derived or signaled.
  a. In one example, for a chroma sub-block, its BV may be derived from its collocated luma block.
  b. In one example, the 1$^{st}$ AMVP/merge candidate may be used to generate IBC prediction.
  c. In one example, the 1$^{st}$ valid AMVP/merge candidate may be used to generate IBC prediction.
  d. In one example, an index may be sent to indicate which merge candidate may be used to generate IBC prediction.
  e. In one example, the 1$^{st}$ HMVP candidate may be used to generate IBC prediction.
  f. In one example, an index may be sent to indicate which HMVP candidate may be used to generate IBC prediction.
  g. In one example, a BV may be sent to generate IBC prediction based on AMVP.
  h. In one example, a BV may be used as a BV prediction of the successively coded blocks.
9. When the above methods are used to a block, the block may be treated as intra block in the in-loop filtering process (e.g., deblocking procedure).
  a. Alternatively, the block may be treated as IBC block in the in-loop filtering process (e.g., deblocking procedure).
  b. Alternatively, samples in the block may be not filtered.
10. When the above methods are used, the block may be treated as intra block in transform procedure.
  a. In one example, intra MTS may be applied to the block.
  b. Alternatively, the block may be treated as IBC block in transform procedure.
    i. In one example, DST7 and DCT8 may not be used for the block.
11. Whether and/or how to apply the above methods may depend on whether IBC is enabled or not
  a. In one example, when IBC is enable, the above methods may be applied.
  b. Alternatively, when IBC is disabled, the above methods may not be applied.
  c. Alternatively, whether the above methods can be applied may depend on a flag/signal at SPS/Tile group/Tile/Brick/PPS/Slice/CTU/CU level.
12. Whether and/or how to apply the above methods may depend on content type
  a. In one example, the above methods may be applied for screen content
  b. In one example, the above methods may be applied for videos contain text and graphics
  c. Alternatively, the above methods may be disallowed for camera-captured content
13. Whether and/or how to apply the above methods may depend on the following information:
  a. A message signaled in the DPS/SPS/VPS/PPS/APS/picture header/slice header/tile group header/Largest coding unit (LCU)/Coding unit (CU)/LCU row/group of LCUs/TU/PU block/Video coding unit
  b. Position of CU/PU/TU/block/Video coding unit
  c. Block dimension of current block and/or its neighboring blocks
  d. Block shape of current block and/or its neighboring blocks
  e. The intra mode of the current block and/or its neighboring blocks
  f. The motion/block vectors of its neighboring blocks
  g. Indication of the color format (such as 4:2:0, 4:4:4)
  h. Coding tree structure
  i. Slice/tile group type and/or picture type
  j. Color component (e.g. may be only applied on chroma components or luma component)
  k. Temporal layer ID
  l. Profiles/Levels/Tiers of a standard FIG. 30 is a block diagram of a video processing apparatus 3000. The apparatus 3000 may be used to implement one or more of the methods described herein. The apparatus 3000 may be embodied in a smartphone, tablet, computer, Internet of Things (IoT) receiver, and so on. The apparatus 3000 may include one or more processors 3002, one or more memories 3004 and video processing hardware 3006. The processor(s) 3002 may be configured to implement one or more methods described in the present document. The memory (memories) 3004 may be used for storing data and code used for implementing the methods and techniques described herein. The video processing hardware 3006 may be used to implement, in hardware circuitry, some techniques described in the present document. The video processing hardware 3006 may be partially or completely includes within the processor(s) 3002 in the form of dedicated hardware, or graphical processor unit (GPU) or specialized signal processing blocks.

Some embodiments may be described using the following clause based description.

1. A method of video processing, comprising: determining, during a conversion between a video block comprising one or more component blocks and a bitstream representation of the video block, to use a first intra coding technique for the conversion of a first portion of the video block and a second intra coding technique different from the first intra coding technique for a second portion of the video block that is different from the first portion based on a condition satisfied by the video block; and performing the conversion using the first intra coding technique and the second intra coding technique according to the determining.

2. The method of clause 1, wherein the first portion of the video block includes a first subset of samples of the video block and the second portion of the video block includes a second subset of samples of the video block.

3. The method of any of clauses 1-2, wherein the determining to use the first intra coding technique for the first portion of the video block is due to determining that a block vector for the first portion of the video block points to an invalid reference area.

4. The method of any of clauses 1-2, wherein the determining is based on a distance between samples of the first portion and samples of the second portion from a neighboring block's reconstruction samples.

5. The method of clause 1, wherein the video block corresponds to a component block that is a chroma block and wherein, for a sub-block of the chroma block, the performing the conversion includes using intra block copy prediction in responsive to determining that a corresponding collocated luma sub-block is coded using intra block copy prediction.

6. The method of clause 1, wherein the video block corresponds to a component block that is a chroma block and wherein, for a sub-block of the chroma block, the performing the conversion includes using intra block copy prediction in responsive to determining a corresponding collocated luma sub-block is coded using intra block copy prediction and that a block vector derived from the corresponding collocated luma sub-block is valid for the sub-block of the chroma block.

7. The method of any of clauses 1-6, wherein the performing the conversion includes generating a prediction value for the video block as a weighted average of a first prediction of the video block generated using the first intra coding technique and a second prediction of the video block generated using the second intra coding technique.

8. The method of clause 7, wherein the weighted average is determined using weights for each samples depending on relative positions within the video block.

9. The method of any of clauses 7-8, wherein a syntax element in the bitstream representation includes information about the weighted average.

10. The method of clause 9, wherein the syntax element is signaled at a sequence level or a picture level or a slice level or a tile group or a tile level or a brick level or a coding tree unit level or a coding tree block level or a coding unit level or a prediction unit level or a transform unit level.

11. The method of any of clauses 7-8, wherein the weighted average is calculated using a pre-specified rule for calculations of weights.

Item 1 is section 4 provides additional features of the above clauses.

12. The method of clause 1, wherein the first portion of the video block corresponds to a first component block and the second portion corresponds to a second component block of the video block.

13. The method of clause 12, wherein the first portion of the video block corresponds to a luma component of the video block and the second portion corresponds to one or more color components of the video block.

Item 2 is section 4 provides additional features of the above clauses.

14. The method of any of clauses 1 to 13, wherein the first intra coding technique comprises a modified intra prediction technique and the second intra coding technique comprises an intra block copy technique in which pixel values of the video block are copied from other pixel values in a video region of the video block, wherein the modified intra prediction technique includes an intra prediction technique that is modified by disabling position dependent intra prediction combination technique, or wherein the modified intra prediction technique includes an intra prediction technique that is modified by disabling reference sample smoothing.

Item 3 is section 4 provides additional features of the above clauses.

15. The method of any of clauses 1 to 13, wherein the first intra coding technique includes an intra prediction mode used in the conversion by deriving of based on signaling in the bitstream representation.

16. The method of clause 15, wherein the deriving includes deriving the intra prediction using a pre-defined most probable mode (MPM).

17. The method of clause 16, wherein the pre-defined most probable mode includes a first MPM or a first available MPM or a first angular MPM.

18. The method of clause 15, wherein the intra prediction mode corresponding to a color component block is determined based on a pre-defined rule.

Item 4 is section 4 provides additional features of the above clauses.

19. The method of clause 1, wherein the first intra coding technique includes an intra prediction mode in which intra prediction is generated by copying neighboring reconstructed samples.

20. The method of clause 19, wherein the neighboring reconstructed samples include samples from a left column or an above row.

Item 5 is section 4 provides additional features of the above clauses.

21. The method of clause 1, wherein the conversion is based on a rule that disallows use of a following technique in the first intra coding technique or the second intra coding technique:
multiple line referencing based intra prediction
intra sub-partition based intra prediction, or
matrix based intra prediction.

22. The method of clause 1, wherein the conversion is based on a rule that disallows use of a following technique in the first intra coding technique or the second intra coding technique:
  multiple transform set based intra prediction, or
  reduced secondary transform based intra prediction.

Item 6 is section 4 provides additional features of the above clauses.

23. The method of any of clauses 1-22, wherein the performing the conversion includes deriving an intra block copy mode and/or block vectors.

24. The method of any of clauses 1-22, wherein the bitstream representation includes a signaling of an intra block copy mode and/or block vectors.

Item 7 is section 4 provides additional features of the above clauses.

25. The method of any of clauses 1 to 24, wherein the conversion further includes performing in-loop filtering using a pre-determined filter.

26. The method of clause 25, wherein the predetermined filter is in intra coding filter or an intra block copy filter.

Item 8 is section 4 provides additional features of the above clauses.

27. The method of any of clauses 1 to 24, wherein the conversion uses a pre-determined transform.

28. The method of clause 25, wherein the predetermined transform an intra coding transform or an intra block copy transform.

Item 9 is section 4 provides additional features of the above clauses.

29. The method of any of clauses 1-28, wherein the condition corresponds to whether or not intra block copy is enabled for the current video block.

30. The method of any of clauses 1-28, wherein the condition is determined based on a bit field in the bitstream representation.

Item 10 is section 4 provides additional features of the above clauses.

31. The method of any of clauses 1-28, wherein the condition depends on a content type of the current video block.

32. The method of clause 31, wherein for content types screen content or text and graphics, the condition specifies to apply the method.

Item 11 is section 4 provides additional features of the above clauses.

33. The method of any of clauses 1-28, wherein the condition corresponds to:
  a message signaled in the DPS/SPS/VPS/PPS/APS/picture header/slice header/tile group header/Largest coding unit (LCU)/Coding unit (CU)/LCU row/group of LCUs/TU/PU block/Video coding unit, or
  a position of CU/PU/TU/block/Video coding unit, or
  a nlock dimension of the current video block and/or its neighboring blocks or
  a block shape of current block and/or its neighboring blocks or
  an intra mode of the current block and/or its neighboring blocks or
  an motion/block vectors of its neighboring blocks or
  an indication of the color format (such as 4:2:0, 4:4:4) or
  a coding tree structure or
  a slice/tile group type and/or picture type or
  a color component or
  a temporal layer ID or
  a profiles or a level or a tier of conversion used by the conversion.

Item 12 is section 4 provides additional features of the above clauses.

34. The method of any of clauses 1 to 33, wherein the conversion includes generating the bitstream representation from the current video block.

35. The method of any of clauses 1 to 33, wherein the conversion includes generating samples of the current video block from the bitstream representation.

36. A video processing apparatus comprising a processor configured to implement a method recited in any one or more of clauses 1 to 35.

37. A computer readable medium having code stored thereon, the code, upon execution, causing a processor to implement a method recited in any one or more of clauses 1 to 35.

Figure 36:
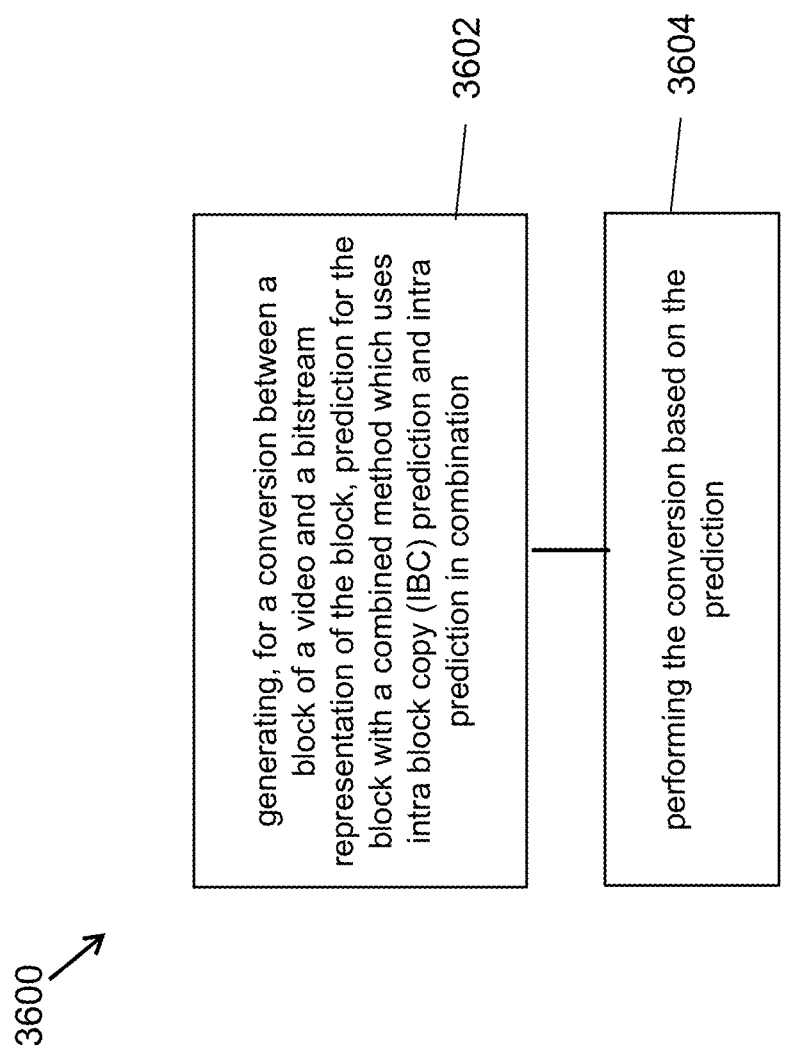
FIG. 36 shows an example of an example method of video processing.

FIG. 36 is a flowchart for an example method 3600 of video processing. The method 3600 includes, at 3602, generating, for a conversion between a block of a video and a bitstream representation of the block, prediction for the block with a combined method which uses intra block copy (IBC) prediction and intra prediction in combination; and at 3604, performing the conversion based on the prediction.

In some examples, a subset of samples in the block use intra prediction signals of the intra prediction as prediction and the remaining samples use IBC prediction signals of the IBC prediction as prediction.

In some examples, for a sample with a block vector pointing to an invalid reference area, the intra prediction is used as prediction for the sample.

In some examples, for a sample with a valid block vector, the IBC prediction is used as prediction for the sample.

In some examples, for samples in the current block that are close to neighboring blocks' reconstruction samples, the intra prediction is used as prediction for the sample.

In some examples, for samples in the current block that are far from neighboring blocks' reconstruction samples, the IBC prediction is used as prediction for the sample.

In some examples, for a chroma sub-block of the block, if its collocated luma sub-block is coded in IBC mode, the IBC prediction is used as prediction for the chroma sub-block.

In some examples, for a chroma sub-block of the block, if its collocated luma sub-block is coded in IBC mode and block vector (BV) derived from the luma sub-block is valid for the chroma sub-block, the IBC prediction is used as prediction for the chroma sub-block.

In some examples, for a chroma sub-block of the block, if its collocated luma sub-block is coded in intra mode, the intra prediction is used as prediction for the chroma sub-block.

In some examples, for a chroma sub-block of the block, if a valid BV is derived from corresponding luma component, the IBC prediction is used as prediction for the chroma sub-block.

In some examples, a BV for the chroma component from the corresponding luma component is derived as a BV associated with a luma sample collocated with a sample of the chroma block.

In some examples, the sample of the chroma block is at the center of the chroma block.

In some examples, the sample of the chroma block is at the top-left of the chroma block.

In some examples, the prediction for the block is generated by weighted averaging intra prediction signals of the intra prediction and IBC prediction signals of the IBC prediction.

In some examples, one or multiple sets of weights are predefined to combine the intra prediction and the IBC prediction.

In some examples, the IBC prediction is treated as an inter mode, and Combined intra-inter prediction (CIIP) weights are applied to combine the intra prediction and the IBC prediction.

In some examples, the weights on a sample are dependent on the relative position of the sample within the block.

In some examples, the weights are dependent on the coded information of the block which includes at least one of intra prediction mode, block dimensions, color component and color formats.

In some examples, indication of usage of the methods and/or weighting values is signaled in at least one of sequence, picture, slice, tile group, tile, brick, coding tree unit (CTU), coding tree block (CTB), coding unit (CU), prediction unit (PU), transform unit (TU), other video unit-level or derived on-the-fly.

In some examples, the combined method is treated as a special IBC mode.

In some examples, if one block is coded as IBC mode, further indications of using conventional IBC method or the combined method is signaled or derived.

In some examples, the combined method is treated as a special intra mode.

In some examples, if one block is coded as intra mode, further indications of using conventional intra method or the combined method is signaled or derived.

In some examples, the combined method is treated as a new prediction mode.

In some examples, the allowed modes including intra mode, inter mode and IBC mode are further extended to include the new prediction mode.

In some examples, generating a final prediction block for the block by using predictions from IBC mode and one or multiple other modes different from IBC mode.

In some examples, the other modes include at least one of palette mode and block differential pulse coded modulation (BDPCM) mode.

In some examples, prediction of one or multiple color components of one video unit are from the intra prediction, and prediction of the other color components of the one video unit are from the IBC prediction.

In some examples, the video unit includes at least one of coding unit, prediction unit and transform unit.

In some examples, the IBC prediction is applied to luma component and the intra prediction is applied to chroma component.

In some examples, the intra prediction is applied to luma component and the IBC prediction is applied to chroma component.

In some examples, when the combined method is used, intra prediction process is modified.

In some examples, a position dependent intra prediction combination (PDPC) mode is disabled when generating the intra prediction signal.

In some examples, reference samples smoothing is disabled when generating the intra prediction signal.

In some examples, when the combined method is used, intra mode is derived or signaled.

In some examples, a certain most probable mode (MPM) mode is used to generate the intra prediction.

In some examples, the first MPM mode is used to generate the intra prediction.

In some examples, the first available MPM mode is used to generate the intra prediction.

In some examples, the first angular MPM mode is used to generate the intra prediction.

In some examples, PLANAR or DC mode is used to generate the intra prediction.

In some examples, VER or HOR mode is used to generate the intra prediction.

In some examples, diagonal or anti-diagonal mode is used to generate the intra prediction.

In some examples, DM mode is used to generate the intra prediction for chroma block of the block.

In some examples, DC mode is used to generate the intra prediction for chroma block of the block.

In some examples, PLANAR mode is used to generate the intra prediction for chroma block of the block.

In some examples, VER mode is used to generate the intra prediction for chroma block of the block.

In some examples, HOR mode is used to generate the intra prediction for chroma block of the block.

In some examples, cross-component linear model (CCLM) modes including at least one of LM, LM-L and LM-T mode are used to generate the intra prediction for chroma block of the block.

In some examples, DC mode is used to generate the intra prediction for luma block of the block.

In some examples, diagonal mode is used to generate the intra prediction for luma block of the block.

In some examples, anti-diagonal mode is used to generate the intra prediction for luma block of the block.

In some examples, PLANAR mode is used to generate the intra prediction for luma block of the block.

In some examples, VER mode is used to generate the intra prediction for luma block of the block.

In some examples, HOR mode is used to generate the intra prediction for luma block of the block.

In some examples, one flag is signaled to indicate whether the intra prediction is horizontal mode or vertical mode.

In some examples, an index is signaled to indicate which MPM mode is to be used to generate the intra prediction for chroma block.

In some examples, a set of intra modes is checked in order so as to derive an intra mode to generate the intra prediction.

In some examples, the intra mode associated with current block is used as a MPM of the successively coded blocks.

In some examples, the block is treated in a similar way as normal IBC mode.

In some examples, the intra mode associated with current block is used to derive DM mode for corresponding chroma block of the current block.

In some examples, DM mode for corresponding chroma block of the block is set to default mode if corresponding luma block of the block is coded with the combined method.

In some examples, when the combined method is applied, during filtering process, the blocks are treated as conventional IBC coded blocks.

In some examples, when the combined method is applied, during filtering process, the blocks are treated as conventional intra coded blocks.

In some examples, when the combined method is applied, during filtering process, the blocks are treated as a new coding mode different from existing IBC mode or intra mode.

In some examples, how to apply filtering process/whether to apply filtering process depend on the usage of the combined method.

In some examples, when the combined method is used, the intra prediction is generated by copying neighboring reconstructed samples.

In some examples, left column to the current block is copied to generate the intra prediction.

In some examples, the copying is performed horizontally.

In some examples, above row to the current block is copied to generate the intra prediction.

In some examples, the copying is performed vertically.

In some examples, left column to the current block, when available, is copied to generate the intra prediction, otherwise, above row to the current block is copied to generate the intra prediction.

In some examples, above row to the current block, when available, is copied to generate the intra prediction, otherwise, left column to the current block is copied to generate the intra prediction.

In some examples, prediction samples in left column or above row to the current sub block are copied to generate the intra prediction.

In some examples, the combined method is applied if the prediction samples in the left column or the above row to the current sub block are in a sub-block predicted by IBC method.

In some examples, when the combined method is used, certain coding technologies on intra blocks are disallowed.

In some examples, the certain coding technologies include certain intra prediction modes.

In some examples, the certain intra prediction modes include at least one of ISP, MRL and matrix-based intra prediction.

In some examples, the certain coding technologies include at least one of Multiple Transform Set (MTS) and Reduced Secondary Transform (RST).

In some examples, when the combined method is used, IBC mode and/or block vectors (BV) for the block are derived or signaled.

In some examples, for a chroma sub-block of the block, its BV is derived from its collocated luma block.

In some examples, the first AMVP or merge candidate is used to generate the IBC prediction.

In some examples, the first valid AMVP or merge candidate is used to generate the IBC prediction.

In some examples, an index is signaled to indicate which merge candidate is used to generate the IBC prediction.

In some examples, the first HMVP candidate is used to generate the IBC prediction.

In some examples, an index is signaled to indicate which HMVP candidate is used to generate the IBC prediction.

In some examples, a BV is signaled to generate the IBC prediction based on AMVP.

In some examples, a BV is used as a BV prediction of the successively coded blocks of the block.

In some examples, when the combined method is used to a block, the block is treated as intra block in the in-loop filtering process.

In some examples, when the combined method is used to a block, the block is treated as IBC block in the in-loop filtering process.

In some examples, when the combined method is used to a block, samples in the block is not filtered in the in-loop filtering process.

In some examples, when the combined method is used, the block is treated as intra block in transform procedure.

In some examples, intra MTS is applied to the block.

In some examples, when the combined method is used, the block is treated as IBC block in transform procedure.

In some examples, DST7 and DCT8 are not used for the block.

In some examples, whether and/or how to apply the combined method depend on whether IBC mode is enabled or not.

In some examples, when IBC mode is enabled, the combined method is applied.

In some examples, when IBC mode is disabled, the combined method is not applied.

In some examples, whether the combined method can be applied depend on a flag or signal at one of SPS, Tile group, Tile, Brick, PPS, Slice, CTU or CU level.

In some examples, whether and/or how to apply the combined method depend on content type.

In some examples, the combined method is applied for screen content.

In some examples, the combined method is applied for videos contain text and graphics.

In some examples, the combined method is disallowed for camera-captured content.

In some examples, whether and/or how to apply the combined method depend on the following information:
  a. a message signaled in at least one of DPS, SPS, VPS, PPS, APS, picture header, slice header, tile group header, Largest coding unit (LCU), Coding unit (CU), LCU row, group of LCUs, TU, PU block, Video coding unit;
  b. position of at least one of CU, PU, TU, block, Video coding unit;
  c. block dimension of current block and/or its neighbouring blocks;
  d. block shape of current block and/or its neighbouring blocks;
  e. the intra mode of the current block and/or its neighbouring blocks;
  f. the motion or block vectors of its neighbouring blocks;
  g. indication of color format including one of 4:2:0, 4:4:4;
  h. coding tree structure;
  i. slice or tile group type and/or picture type;
  j. color component including chroma components or luma component;
  k. temporal layer ID; and
  l. profiles and/or levels and/or tiers of a standard.

FIG. 37 is a flowchart for an example method 3700 of video processing. The method 3700 includes, at 3702, splitting, for a conversion between a block of a video and a bitstream representation of the block, the block into multiple sub-blocks; at 3704, generating at least prediction block of a first sub-block with intra block copy (IBC) mode and generating at least prediction block of a second sub-block with other method selected from a group excluding IBC mode; and at 3706, performing the conversion based on the prediction blocks.

In some examples, all IBC-coded sub-blocks share a same block vector (BV).

In some examples, different IBC-coded sub-blocks have different block vectors (BVs).

In some examples, only one block vector (BV) is signaled or derived from bitstream of the block.

In some examples, multiple block vectors (BVs) are signaled or derived from bitstream of the block.

In some examples, sub-block size is fixed for all sub-blocks within the block.

In some examples, the sub-block size is 4×4, or minimum unit for storing motion information or BV or minimum unit for allowing IBC mode.

In some examples, different sub-blocks are assigned with different sub-block sizes.

In some examples, IBC mode enabling or disabling is controlled at sub-block level instead of whole block level.

In some examples, for a luma block of the block, a block vector (BV) is valid for partial of sub-blocks and invalid for the other sub-blocks.

In some examples, a BV is invalid if the prediction block indicated by the BV is not fully reconstructed.

In some examples, a BV is invalid if the prediction block indicated by the BV is outside the current picture or slice or tile group or brick.

In some examples, a BV is invalid if the prediction block indicated by the BV is overlapped with the current block.

In some examples, for the sub-block with the BV marked as valid, the prediction signal of the sub-block is generated using the IBC mode.

In some examples, for the sub-block with the BV marked as invalid, the prediction signal of the sub-block is generated using other modes excluding IBC mode.

In some examples, intra prediction is employed to generate predictions for the sub-blocks with invalid block or motion vectors.

In some examples, palette prediction is employed to generate predictions for the sub-blocks with invalid block or motion vectors.

In some examples, the conversion generates the block of video from the bitstream representation.

In some examples, the conversion generates the bitstream representation from the block of video.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document

The invention claimed is:

1. A method of processing video data, comprising:
generating, for a conversion between a block of a video and a bitstream of the block, a prediction for the block with a combined method which uses an intra block copy (IBC) prediction and an intra prediction in combination; and
performing the conversion based on the prediction,
wherein a subset of samples in the block uses intra prediction signals of the intra prediction as a prediction and remaining samples use IBC prediction signals of the IBC prediction as the prediction,
wherein, for samples in the block that are close to neighboring blocks' reconstruction samples, the intra prediction is used as a prediction for the samples, and
wherein for a chroma sub-block of the block, when its collocated luma sub-block is coded in IBC mode or when a valid block vector (BV) is derived from corresponding luma component, the IBC prediction is used as a prediction for the chroma sub-block.

2. The method of claim 1, wherein for a sample with a block vector pointing to an invalid reference area, the intra prediction is used as a prediction for the sample.

3. The method of claim 1, wherein the prediction for the block is generated by a weighted averaging of the intra prediction signals of the intra prediction and the IBC prediction signals of the IBC prediction.

4. The method of claim 3, wherein one or multiple sets of weights are predefined to combine the intra prediction and the IBC prediction.

5. The method of claim 1, wherein generating a final prediction block for the block by using predictions from an IBC mode and one or multiple other modes different from the IBC mode.

6. The method of claim 1, wherein a prediction of one or multiple color components of one video unit is from the intra prediction, and the prediction of other color components of the one video unit is from the IBC prediction.

7. The method of claim 1, wherein, when the combined method is used, an intra prediction process is modified.

8. The method of claim 1, wherein when the combined method is used, the intra prediction is generated by copying neighboring reconstructed samples.

9. The method of claim 1, wherein, when the combined method is used, samples in the block are not filtered in an in-loop filtering process.

10. The method of claim 1, wherein when the combined method is used, the block is treated as an IBC block in transform procedure.

11. The method of claim 1, wherein whether and/or how to apply the combined method depend on whether an IBC mode is enabled or not.

12. The method of claim 1, wherein whether and/or how to apply the combined method depends on at least one of:
a. a message signaled in at least one of DPS, SPS, VPS, PPS, APS, picture header, slice header, tile group header, Largest coding unit (LCU), Coding unit (CU), LCU row, group of LCUs, TU, PU block, Video coding unit;
b. position of at least one of CU, PU, TU, block, Video coding unit;
c. block dimension of current block and/or its neighboring blocks;
d. block shape of current block and/or its neighboring blocks;
e. an intra mode of the current block and/or its neighboring blocks;
f. motion vectors or block vectors of its neighboring blocks;
g. indication of color format including one of 4:2:0, 4:4:4;
h. coding tree structure;
i. slice or tile group type and/or picture type;
j. color component including chroma components or luma component;
k. temporal layer ID; and
l. Profiles and/or levels and/or tiers of a standard.

13. The method of claim 1, wherein the conversion includes decoding the bitstream from the block of the video.

14. The method of claim 1, wherein the conversion includes encoding the block of the video from the bitstream.

15. An apparatus for processing video data comprising a processor and a non-transitory memory with instructions thereon, wherein the instructions upon execution by the processor, cause the processor to:
generate, for a conversion between a block of a video and a bitstream of the block, a prediction for the block with a combined method which uses an intra block copy (IBC) prediction and an intra prediction in combination; and
perform the conversion based on the prediction,
wherein a subset of samples in the block uses intra prediction signals of the intra prediction as a prediction and remaining samples use IBC prediction signals of the IBC prediction as the prediction,
wherein, for samples in the block that are close to neighboring blocks' reconstruction samples, the intra prediction is used as a prediction for the samples, and
wherein for a chroma sub-block of the block, when its collocated luma sub-block is coded in IBC mode or when a valid block vector (BV) is derived from corresponding luma component, the IBC prediction is used as a prediction for the chroma sub-block.

16. A method for storing a bitstream of a video, comprising:
generating, for a block of the video, a prediction for the block with a combined method which uses an intra block copy (IBC) prediction and an intra prediction in combination;
generating the bitstream based on the generating; and
storing the bitstream in a non-transitory computer readable medium,
wherein a subset of samples in the block uses intra prediction signals of the intra prediction as a prediction and remaining samples use IBC prediction signals of the IBC prediction as the prediction,
wherein, for samples in the block that are close to neighboring blocks' reconstruction samples, the intra prediction is used as a prediction for the samples, and
wherein for a chroma sub-block of the block, when its collocated luma sub-block is coded in IBC mode or when a valid block vector (BV) is derived from corresponding luma component, the IBC prediction is used as a prediction for the chroma sub-block.

* * * * *